(12) United States Patent
Morishita et al.

(10) Patent No.: US 6,757,792 B2
(45) Date of Patent: Jun. 29, 2004

(54) STORAGE SYSTEM AND METHOD OF CONFIGURING THE STORAGE SYSTEM

(75) Inventors: Noboru Morishita, Yokohama (JP); Hiroshi Arakawa, Yokohama (JP); Seiji Kaneko, Zama (JP); Hisao Honma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 334 days.

(21) Appl. No.: 09/945,671

(22) Filed: Sep. 5, 2001

(65) Prior Publication Data

US 2003/0167375 A1 Sep. 4, 2003

(30) Foreign Application Priority Data

Aug. 6, 2001 (JP) ........................................ 2001-237439

(51) Int. Cl.⁷ .......................... G06F 12/00; G06F 12/02; G06F 13/00; G11C 29/00; G11B 17/22
(52) U.S. Cl. ........................ 711/154; 711/112; 711/150; 711/162; 711/167; 711/168; 714/6; 714/7; 714/8; 714/47; 714/710; 369/30.28
(58) Field of Search ................................ 711/112, 154, 711/162, 150, 168; 714/7, 47, 8, 710, 6; 369/30.28

(56) References Cited

U.S. PATENT DOCUMENTS 5,720,028 A * 2/1998 Matsumoto et al. ........... 714/9
5,737,742 A * 4/1998 Achiwa et al. ............. 711/103
6,446,223 B1 * 9/2002 Morishita et al. ............. 714/47
2001/0039632 A1 * 11/2001 MacLaren et al. ............. 714/6
2002/0133740 A1 * 9/2002 Oldfield et al. ............... 714/6
2002/0133743 A1 * 9/2002 Oldfield et al. ............... 714/11

FOREIGN PATENT DOCUMENTS

JP          2003050749 A  *  2/2003  ........... G06F/12/16

* cited by examiner

Primary Examiner—Hong Kim
Assistant Examiner—H. B. Patel
(74) Attorney, Agent, or Firm—Mattingly, Stanger & Malur, P.C.

(57) ABSTRACT

When storage controllers are added to a storage system to change the storage system from a configuration having only one storage controller to a configuration having plural storage controllers, or when storage controllers are removed from the storage system to change the storage system from a configuration having plural storage controllers to a configuration having only one storage controller, a controller-internal management-information memory controller carries out a copy process to copy management information from each of the storage controllers to a management-information-memory switch or vice versa at the same time as processing of read and write requests for access to the management information, made by a channel interface or a disc interface, in order to change storage locations of the management information while processing the read and write requests made by the host.

8 Claims, 14 Drawing Sheets

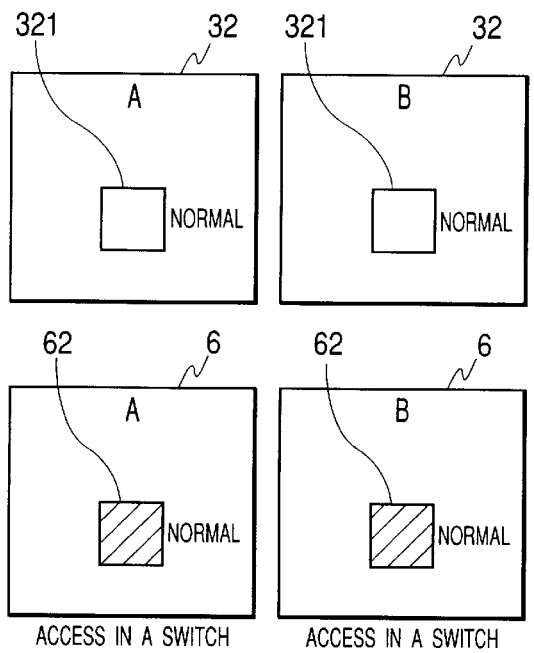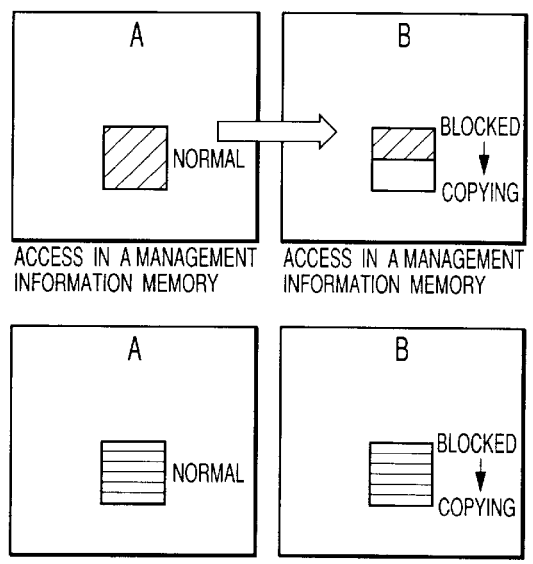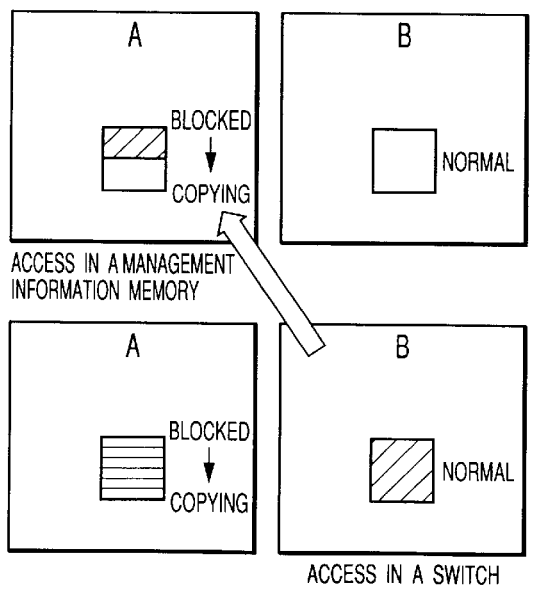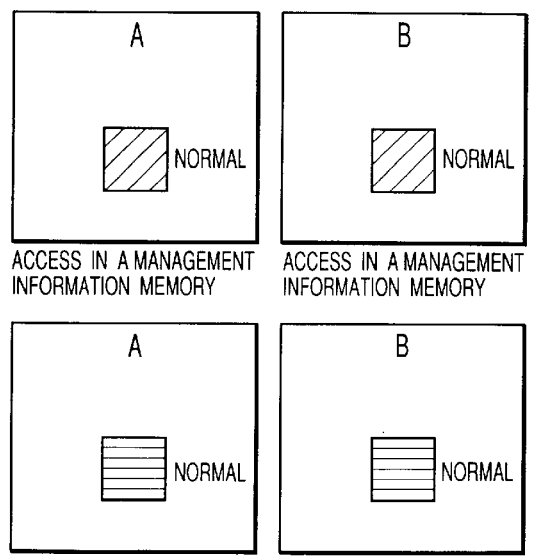

STORAGE SYSTEM AND METHOD OF CONFIGURING THE STORAGE SYSTEM

BACKGROUND OF THE INVENTION

1. Field of the Invention

In general, the present invention relates to a storage system and a method of configuring the storage system. More particularly, the present invention relates to a storage system suitable for executing centralized management of management information of the storage system, which is capable of continuing its operation, that is, without halting the operation, when changing the storage system's configuration comprising one storage controller or a plurality of storage controllers without regard to the configuration, and relates to a method of configuring the storage system.

2. Description of the Related Art

There are a variety of storage systems, from a large-scale storage system demanded by typically a data center of an enterprise to a small-scale storage system demanded by the general open market. In either case, performance and a storage capacity required of a small or large-scale storage system greatly vary in accordance with the application.

In order to solve a problem of scalability required of a storage system, there has been proposed a conventional method whereby a switch is provided between a host computer and a storage system so as to allow an additional storage system to be connected to the host computer by connecting the switch by using a transfer path used in connecting the storage systems to the host computer.

Also in order to solve a problem of scalability required of a storage system, there has been conceived another method whereby a plurality of components are connected to each other to form a multi-component storage system which appears to a host computer as a single storage system. In accordance with this method, data transfer paths and management-information transfer paths inside the multi-component storage system are typically connected to each other to integrate the components into a single storage system.

On the other hand, a micro program of a conventional storage system is written by assuming that the storage system serving as a control object both logically and physically has a structure of a single storage system. Thus, with a plurality of small-size storage systems connected to each other to form a single storage system, if all the storage systems are not regarded logically as a single storage system, it is necessary to revise the conventional micro program's basic recognition of the storage system. In this case, a modification range involves the entire micro program and the scale of the modification becomes extremely large.

Thus, also when a plurality of components are connected to each other to form a single storage system, there is raised a demand to regard the structure of the connected components logically as the structure of the single storage system so that the micro program can be applied in a diversionary way.

If the structure of storage-system components is regarded logically as the structure of a single storage system, management information of the single storage system is information of integrity, that is, information that cannot be separated into portions of the storage-system components as is the case with the management information of the conventional storage system. For this reason, in order to store the management information, it is necessary to allocate a logically contiguous memory area as is the case with the conventional storage system.

As one of methods to allocate a memory area for storing management information, management-information memories distributed among storage-system components are used. If physically distributed management-information memories are to be managed logically as a management-information memory, however, a maintenance function becomes difficult to implement. This is because, in the conventional storage system, management information is stored in a physically single management-information memory.

Assume that a plurality of components or small-size storage systems are connected to each other to form a single storage system and, in the state in which the connected components appear as a single storage system, any arbitrary small-size storage system is removed. In this case, an area for storing a part of management area is also removed as well. Since the management information is information of integrity which cannot be separated into portions, the management information becomes unusable even if only a part thereof is lost. Thus, if any arbitrary small-size storage system is removed, it is necessary to halt the operation of the storage system.

By the way, members other than management-information memories each used for storing management information are also distributed among small-size storage systems. In implementation of a maintenance function for such members, the conventional maintenance method can be adopted in a diversionary way relatively with ease. This is because, the conventional storage system also has functions to partially block, maintain and recover configuration elements other than the management-information memories.

As described above, the conventional technology provides a method whereby a plurality of components or small-sized storage systems are connected to each other to form a single storage system. However, this method has the following problems.

In the method whereby a plurality of components or small-sized storage systems are connected to each other to form a single storage system, a technique to manage all the small-sized storage systems is not taken into consideration.

Thus, an attempt made to apply the micro program of the conventional storage system raises a problem that the scale to modify the micro program becomes extremely large and the diversionary application of the micro program becomes difficult.

In addition, the method whereby a plurality of components or small-sized storage systems are connected to each other to form a single storage system does not consider a technique to store the storage system's management information of integrity that cannot be separated into portions of the small-size storage systems in management of the small-sized storage systems as a logically single storage system.

Thus, management information is stored in management-information memories employed in the physically distributed small-size storage systems, making the maintenance function difficult to implement. In addition, there is also raised a problem that, since the management information is also physically distributed, performance to make accesses to management information deteriorates as well.

Furthermore, in the conventional technology, a flexible technique of coping with changes in storage-system configuration is not taken into consideration either.

For example, when the storage-system configuration is changed from a configuration comprising a component of a storage system to a configuration comprising a plurality of components composing the storage system, making it necessary to transfer management information from one location to another, the operation of the storage system must be halted, raising a problem that a host is not capable of making an access to a disc storage in the mean time. This problem becomes serious in particular in a version-up process of a large-scale storage system which must be operated all the time.

BRIEF SUMMARY OF THE INVENTION

It is thus an object of the present invention addressing the problems described above to provide a storage system that:
allows the configuration thereof to be changed with ease;
can be logically managed as a single storage system even if the single storage system is formed by connecting a plurality of components or small-sized storage systems to each other;
selects a storage location of management information in accordance with the configuration of the storage system so as to implement centralized management of management information without regard to the configuration of the storage system; and
does not allow performance to make accesses to management information to deteriorate.

It is another object of the present invention to provide a method of configuring a storage system that allows the configuration thereof to be changed without halting the operation of the storage system so as to allow a host to make an access to a disc storage while the configuration is being changed.

In order to achieve one of the objects described above, in accordance with the present invention's aspect related to a storage system, there is provided a storage system allowing a host computer to make accesses to storages and comprising one or more storage controllers and the storages wherein:
each of the storage controllers includes:
a channel interface connected to the host computer;
an interface connected to the storages; and
a management-information memory for storing management information of the storage system;
if the storage system includes a plurality of the storage controllers, the management-information memories employed in the storage controllers are connected to each other by a management-information-memory switch having a switch-internal management-information memory module;
if the storage system includes only one storage controller, the management-information memory of the storage controller has a controller-internal management-information memory controller and a controller-internal management-information memory module;
if the storage system includes a plurality of the storage controllers, the management-information memories employed in the storage controllers each have the controller-internal management-information memory controller;
if the storage system includes only one storage controller, the controller-internal management-information memory controller makes an access to the controller-internal management-information memory module inside the storage controller; and
if the storage system includes a plurality of the storage controllers, the controller-internal management-information memory controllers make accesses to the switch-internal management-information memory module inside the management-information-memory switch.

To put it in more detail, if the storage system includes only one storage controller, management information is stored in the controller-internal management-information memory module inside the storage controller. If the storage system includes a plurality of the storage controllers, on the other hand, management information is stored in the switch-internal management-information memory module inside the management-information-memory switch.

In order to achieve the other object described above, in accordance with the present invention's other aspect related to a method of configuring a storage system, there is provided a method of configuring a storage system allowing a host computer to make accesses to storages and comprising one or more storage controllers and the storages wherein:
each of the storage controllers includes:
a channel interface connected to the host computer;
an interface connected to the storages; and
a management-information memory for storing management information of the storage system;
if the storage system includes only one of the storage controllers, the management-information memory of the storage controller has a controller-internal management-information memory controller and a controller-internal management-information memory module; and
if the storage system includes a plurality of the storage controllers, the management-information memories employed in the storage controllers are connected to each other by a management-information-memory switch having a switch-internal management-information memory module and the management-information memories employed in the storage controllers each have the controller-internal management-information memory controller.

To put it in more detail, if the storage system includes only one of the storage controller, management information is stored in the controller-internal management-information memory module inside the storage controller. If the storage system includes a plurality of the storage controllers, on the other hand, management information is stored in the switch-internal management-information memory module inside the management-information-memory switch.

In order to achieve the other object described above, in accordance with the present invention's other aspect related to the method of configuring a storage system wherein the management-information memories employed in each of the additional storage controllers and the management-information-memory switches consist of duplicated-management-information-storing systems, there is provided the method's configuration for installing an additional one of the storage controllers whereby, when some of the storage controllers are newly installed in addition to only one of the storage controller already existing in the storage system:
the management-information-memory switches are newly added for connecting the management-information memories employed in the storage controllers to each other;
for each of the duplicated-management-information-storing systems, the management-information memory is connected to the management-information-memory switch;
to change stored locations of management information from the management-information memories of the storage controller already existing in said storage system to the management-information-memory switches, the duplicated-management-information-storing systems are sequentially subjected one system after another to a procedure comprising the steps of:

blocking one of the duplicated-management-information-storing systems;

copying management information of the unblocked one of the duplicated-management-information-storing systems from the management-information memory to the management-information-memory switch of the blocked duplicated-management-information-storing system; and de-blocking the blocked duplicated-management-information-storing system; and the storage system carries out processing of an access made by the host computer to the storages while the stored locations are being changed by using management information stored in an unblocked one of the duplicated-management-information-storing systems.

In order to achieve the other object described above, in accordance with the present invention's other aspect related to the method of configuring a storage system wherein the management-information memories employed in each of the additional storage controllers and the management-information-memory switches consist of duplicated-management-information-storing systems, there is provided the method's other configuration for removing any one of the storage controllers whereby, when some of the storage controllers are removed from the storage systems to leave only one of the storage controllers in the storage system with the management-information memories connected to the management-information-memory switch in all the duplicated-management-information-storing systems, to change stored locations of management information from the management-information-memory switches to the management-information memories of the storage controller to leave alone in said storage system, the duplicated-management-information-storing systems are sequentially subjected one system after another to a procedure comprising the steps of:

blocking any one of the duplicated-management-information-storing systems;

copying management information of the unblocked one of the duplicated-management-information-storing systems from the management-information-memory switch to the management-information memory of the blocked duplicated-management-information-storing system; and de-blocking the blocked duplicated-management-information-storing system, and the storage system carries out processing of an access made by the host computer to the storages while the stored locations are being changed by using management information stored in an unblocked one of the duplicated-management-information-storing systems.

In order to achieve the other object described above, in accordance with the present invention's other aspect related to the method of configuring a storage system, there is provided the method's further configuration for installing an additional one of the storage controllers whereby, when some of the storage controllers are newly installed in addition to only one of the storage controllers already existing in the storage system:

said management-information-memory switch is newly added for connecting said management-information memories employed in said storage controllers to each other; and to change stored locations of management information from the management-information memory employed in the storage controller already existing in said storage system to the management-information-memory switches, management information stored in the management-information memory is copied to the management-information-memory switch in a copy operation; and the storage system carries out processing of an access made by the host computer to the storages while the stored locations are being changed by using management information stored in the management-information memory employed in the storage controllers each serving as a source of the copy operation.

In order to achieve the other object described above, in accordance with the present invention's other aspect related to the method of configuring a storage system, there is provided the method's still further configuration for removing any one of the storage controllers whereby, when some of the storage controllers are removed from the storage systems to leave only one of the storage controllers in the storage system with the management-information memories connected to the management-information-memory switch:

to change stored locations of management information from the management-information-memory switch to the management-information-memory of the storage controller to leave alone in said storage system, management information stored in the management-information-memory switch is copied to the management-information memories in a copy operation; and the storage system carries out processing of an access made by the host computer to the storages while the stored locations are being changed by using management information stored in the management-information-memory switch serving as a source of the copy operation.

BRIEF DESCRIPTION OF SEVERAL VIEWS OF DRAWINGS

Figure 3:
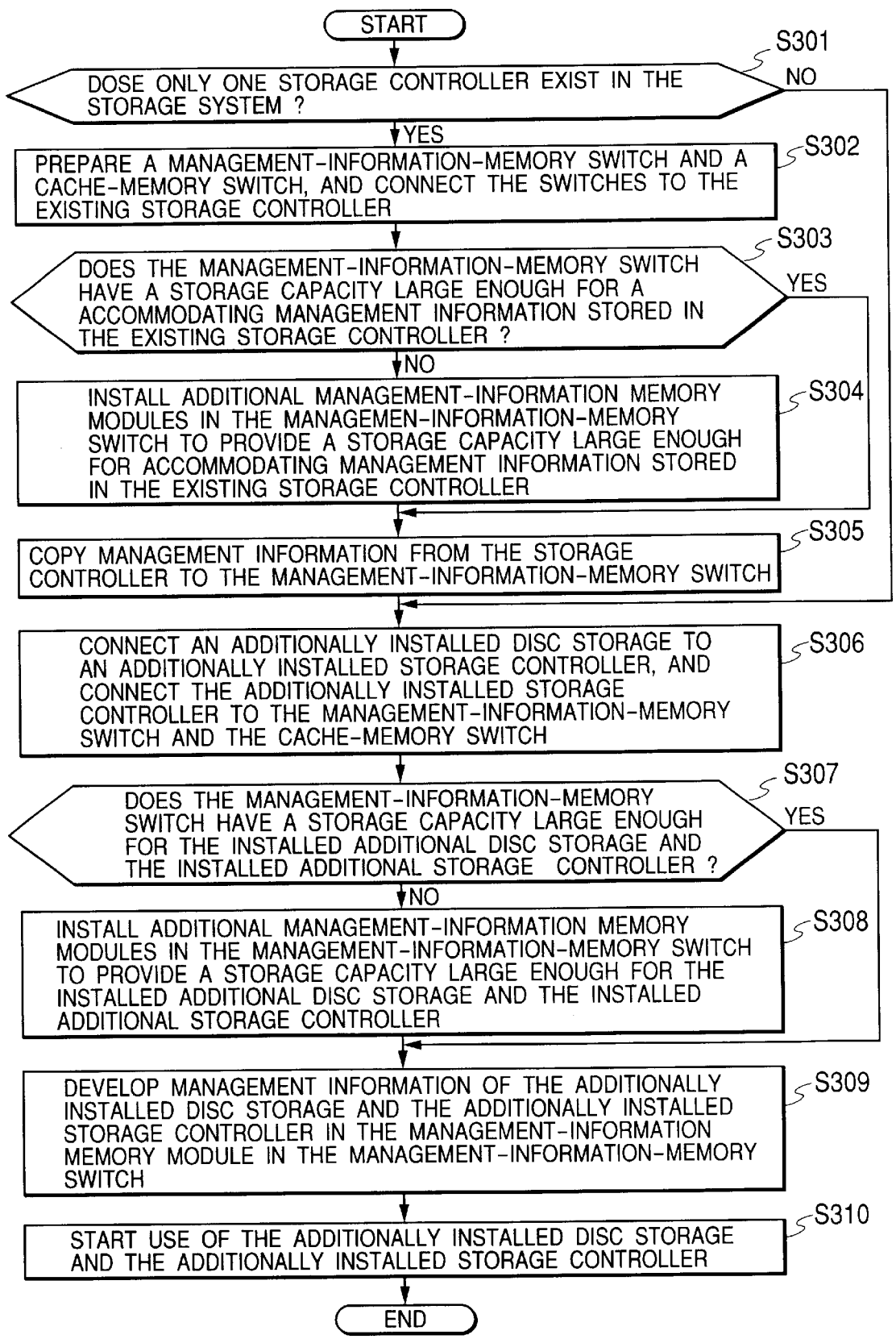
Figure 4:
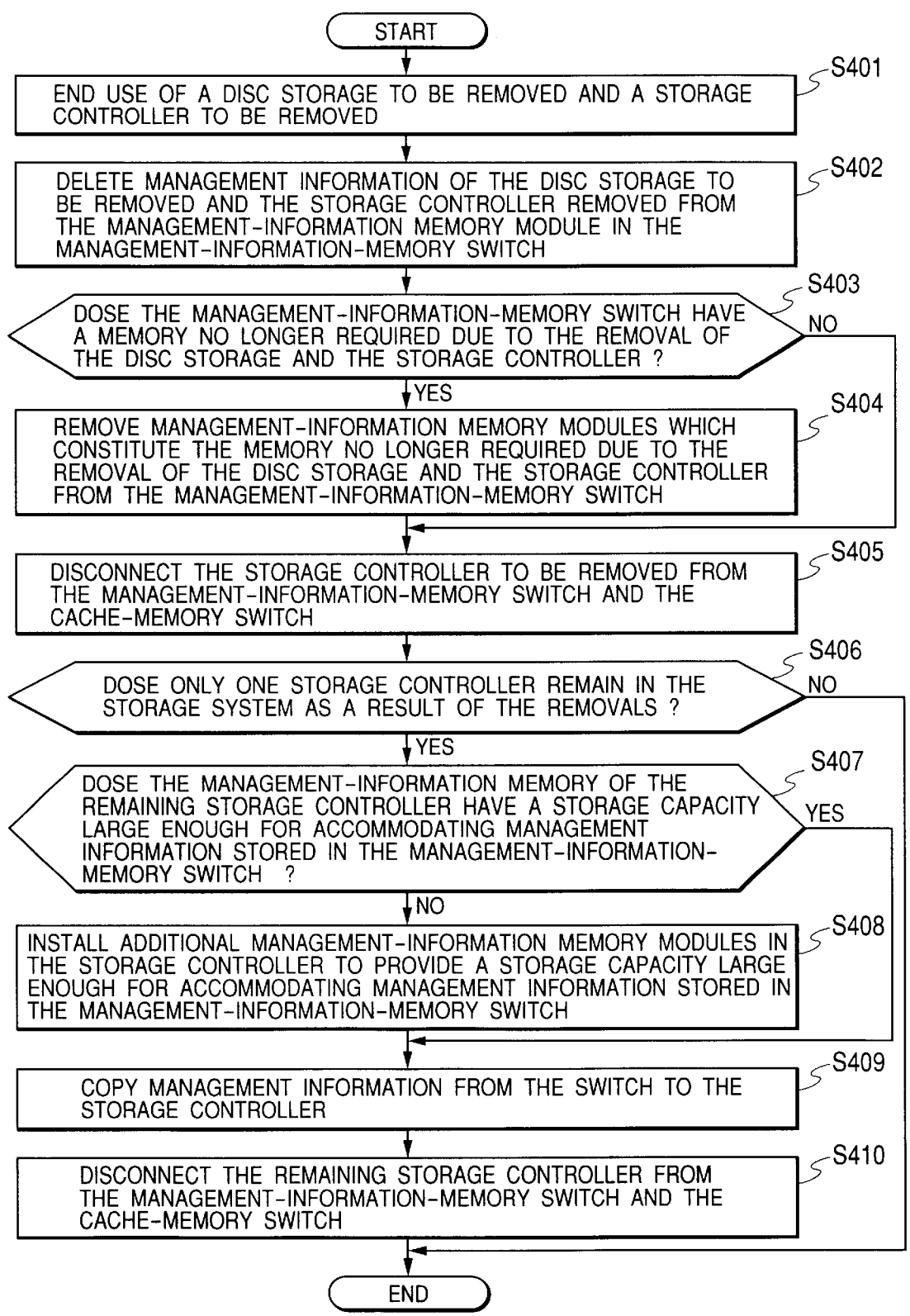
Figure 5:
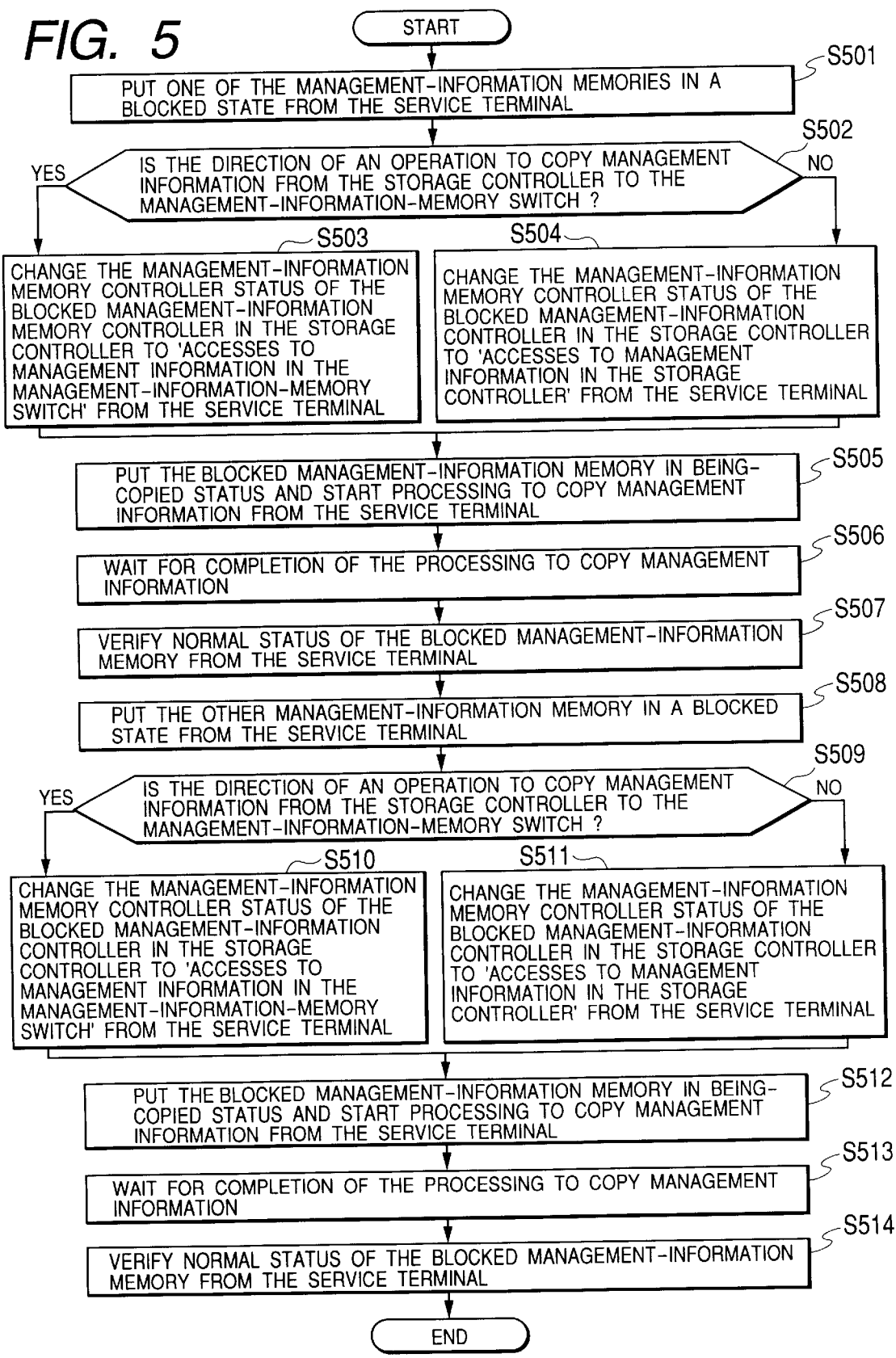
Figure 6:
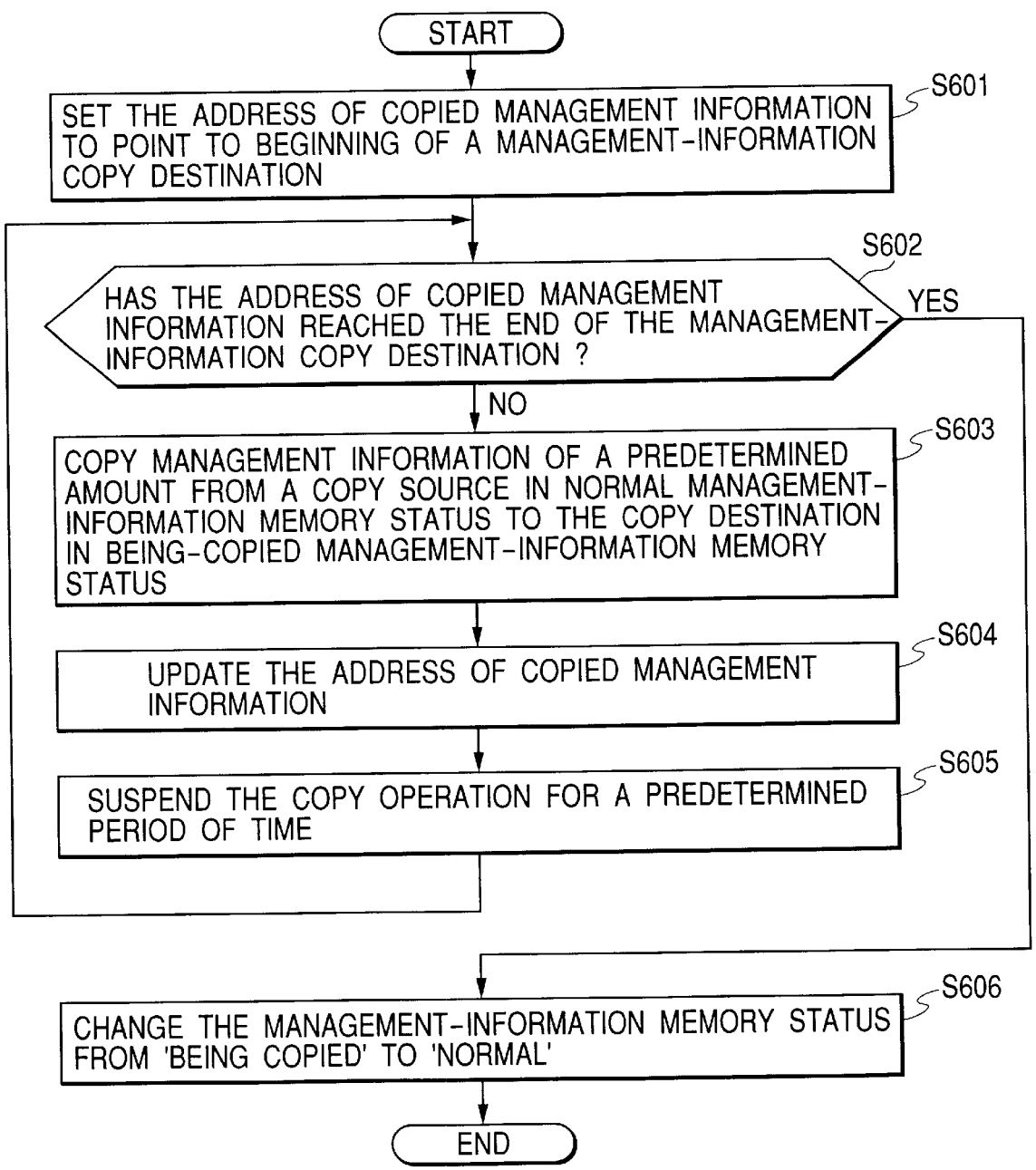
Figure 7:
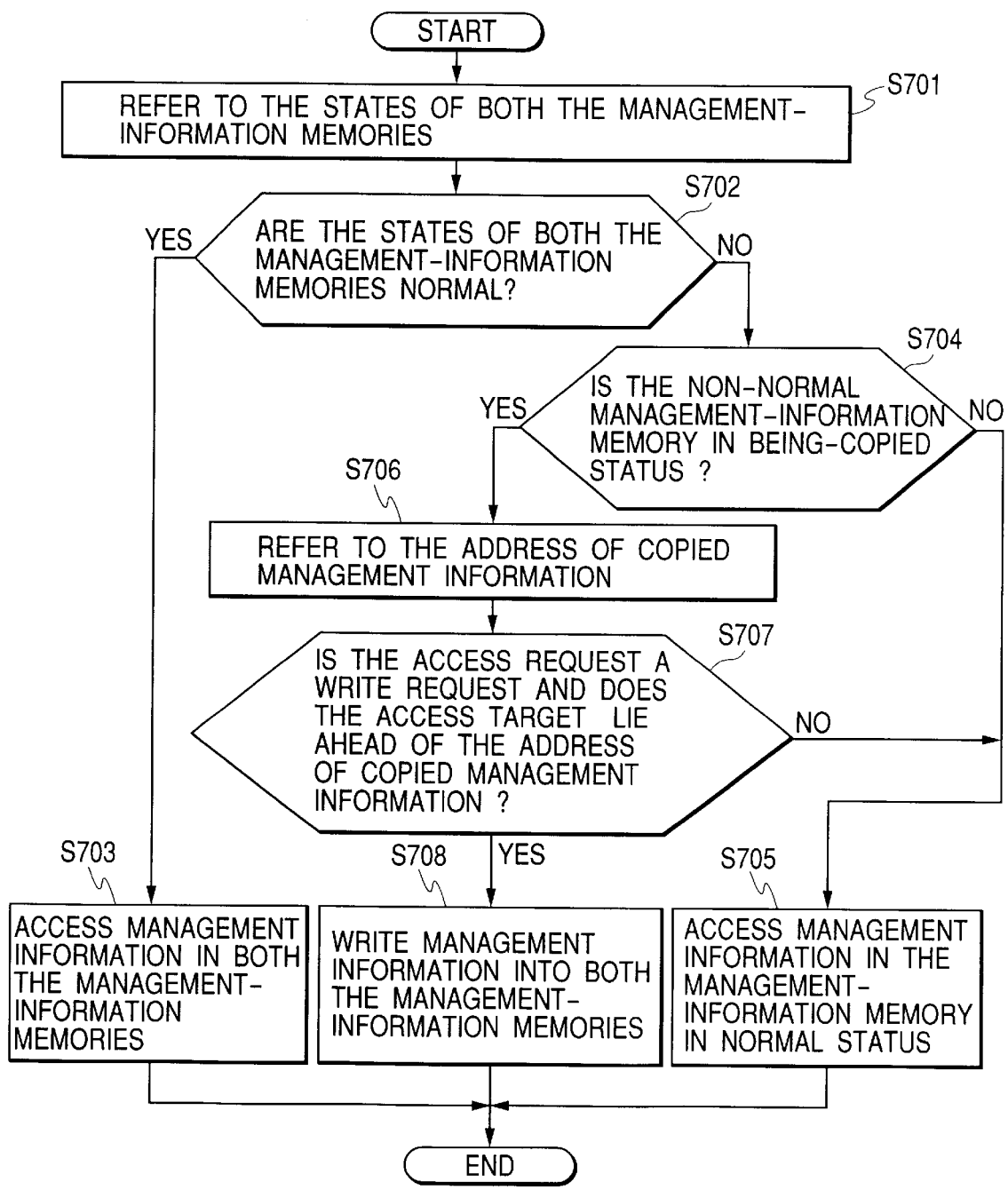
Figure 10:
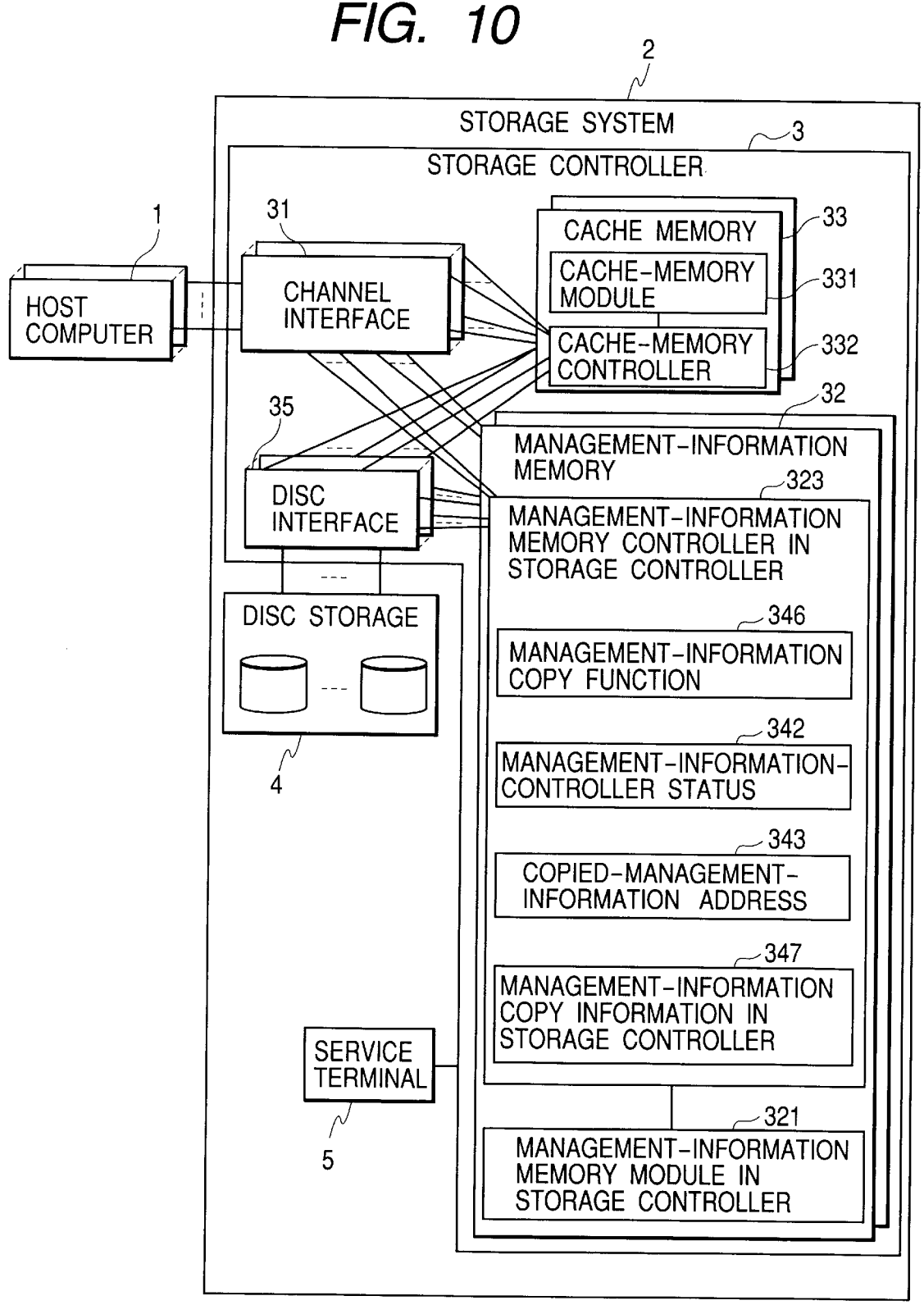
Figure 11:
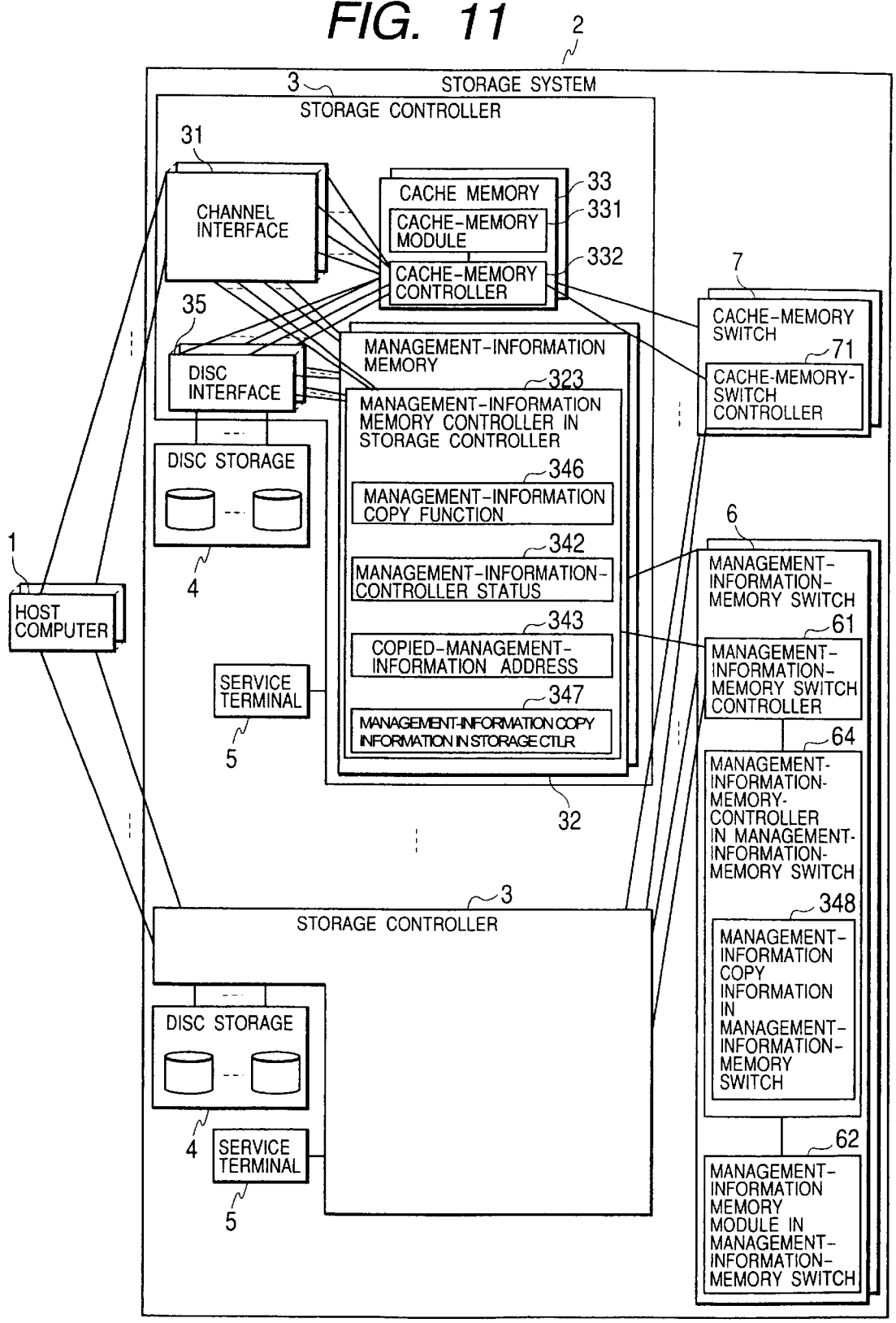
Figure 12:
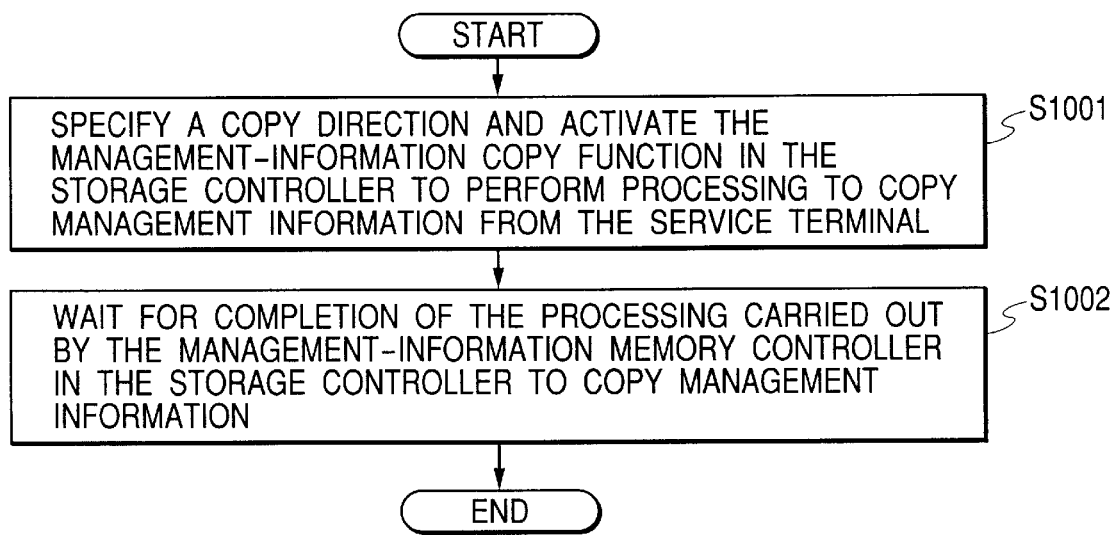
Figure 13:
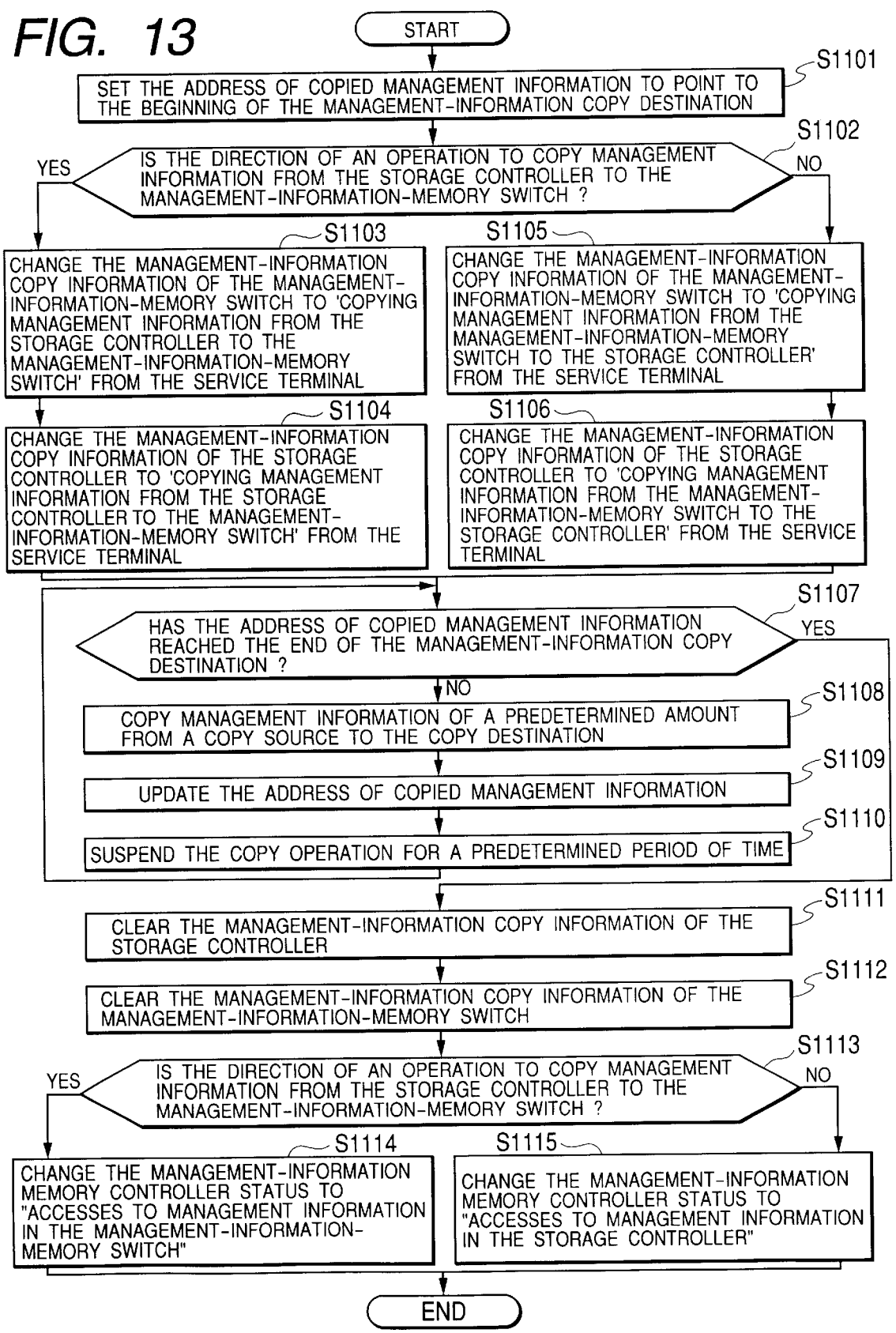
Figure 14:
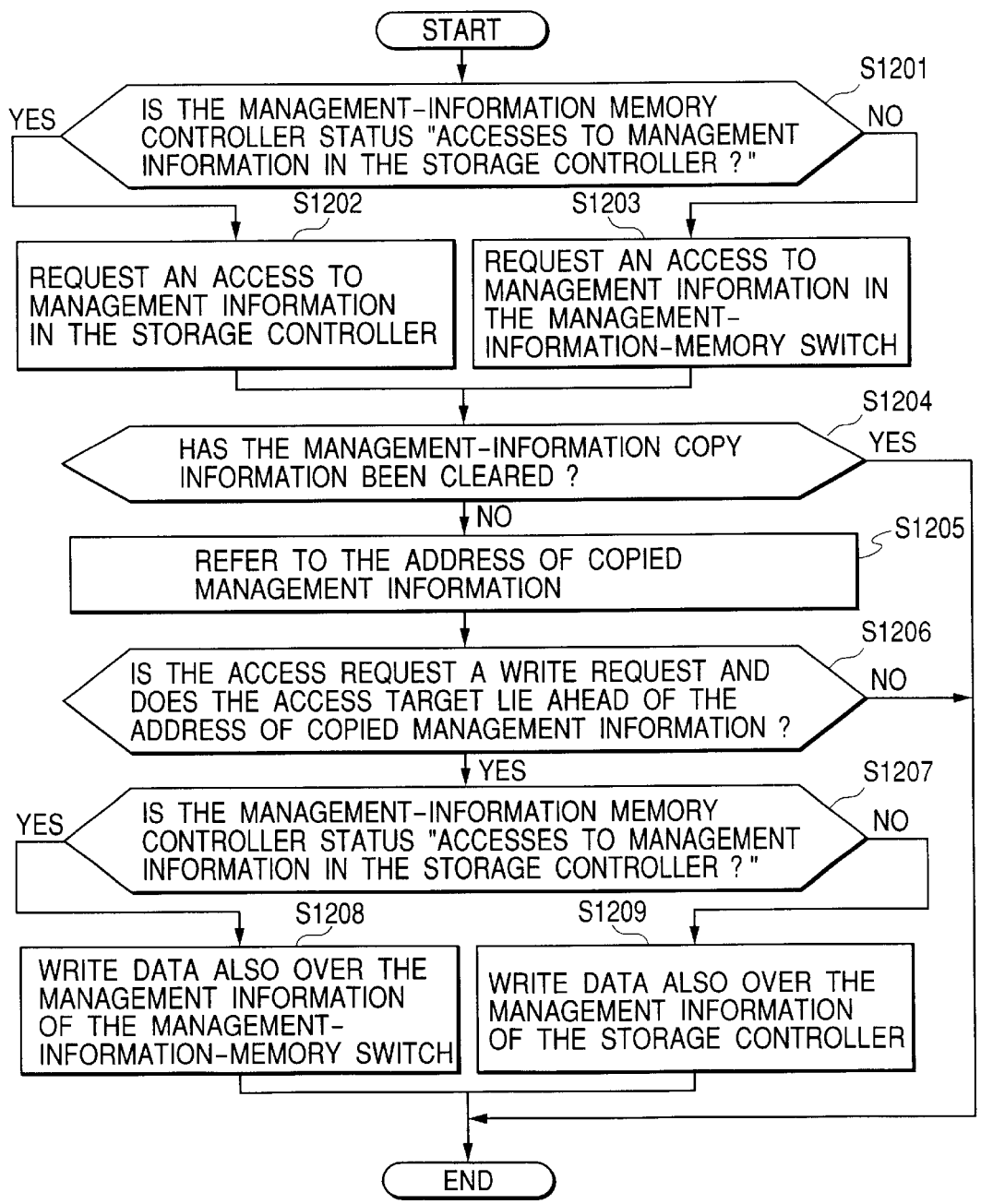

FIG. 3 is a flowchart representing a procedure for installing additional storage controllers 3 and additional disc storages 4 composing the storage system 2 implemented by the first embodiment of the present invention;

FIG. 4 is a flowchart representing a procedure for removing storage controllers 3 and disc storages 4 composing the storage system 2 implemented by the first embodiment of the present invention from the storage system 2;

FIG. 5 is a flowchart representing a procedure for copying management information when installing or removing storage controllers 3 and disc storages 4 in or from the storage system 2;

FIG. 6 is a flowchart representing a management-information copy process 341 carried out in a channel interface 31;

FIG. 7 is a flowchart representing a procedure followed by the channel interface 31 carrying out processing other than the management-information copy process 341 and a disc interface 35 for making an access to management information;

FIGS. 8(a)–8(d) show a model representing flows of data in a process to copy management information and an outline of the copy process in the first embodiment of the present invention wherein the management information is copied from a management-information memory module 321 employed in a storage controller 3 to a management-information memory module 62 employed in a management-information-memory switch 6;

FIGS. 9(a)–9(d) show a model representing flows of data in a process to copy management information and an outline of the copy process in the first embodiment of the present invention wherein the management information is copied from a management-information memory module 62 employed in a management-information-memory switch 6 to a management-information memory module 321 employed in a storage controller 3;

FIG. 10 is a diagram showing the configuration of a storage system including only one storage controller as implemented by a second embodiment of the present invention;

FIG. 11 is a diagram showing the configuration of a storage system including a plurality of storage controllers as implemented by the second embodiment of the present invention;

FIG. 12 is a flowchart representing a procedure for copying management information when installing or removing storage controllers 3 and disc storages 4 in or from the storage system 2;

FIG. 13 is a flowchart representing a management-information copy function 346 carried out in the storage controller 3; and FIG. 14 is a flowchart representing a procedure followed by the channel interface 31 carrying out processing other than the management-information copy function 346 and a disc interface 35 for making an access to management information;

PREFERRED EMBODIMENTS OF THE INVENTION

Preferred embodiments of the present invention are described by referring to FIGS. 1 to 14 as follows.

First Embodiment

Figure 1:
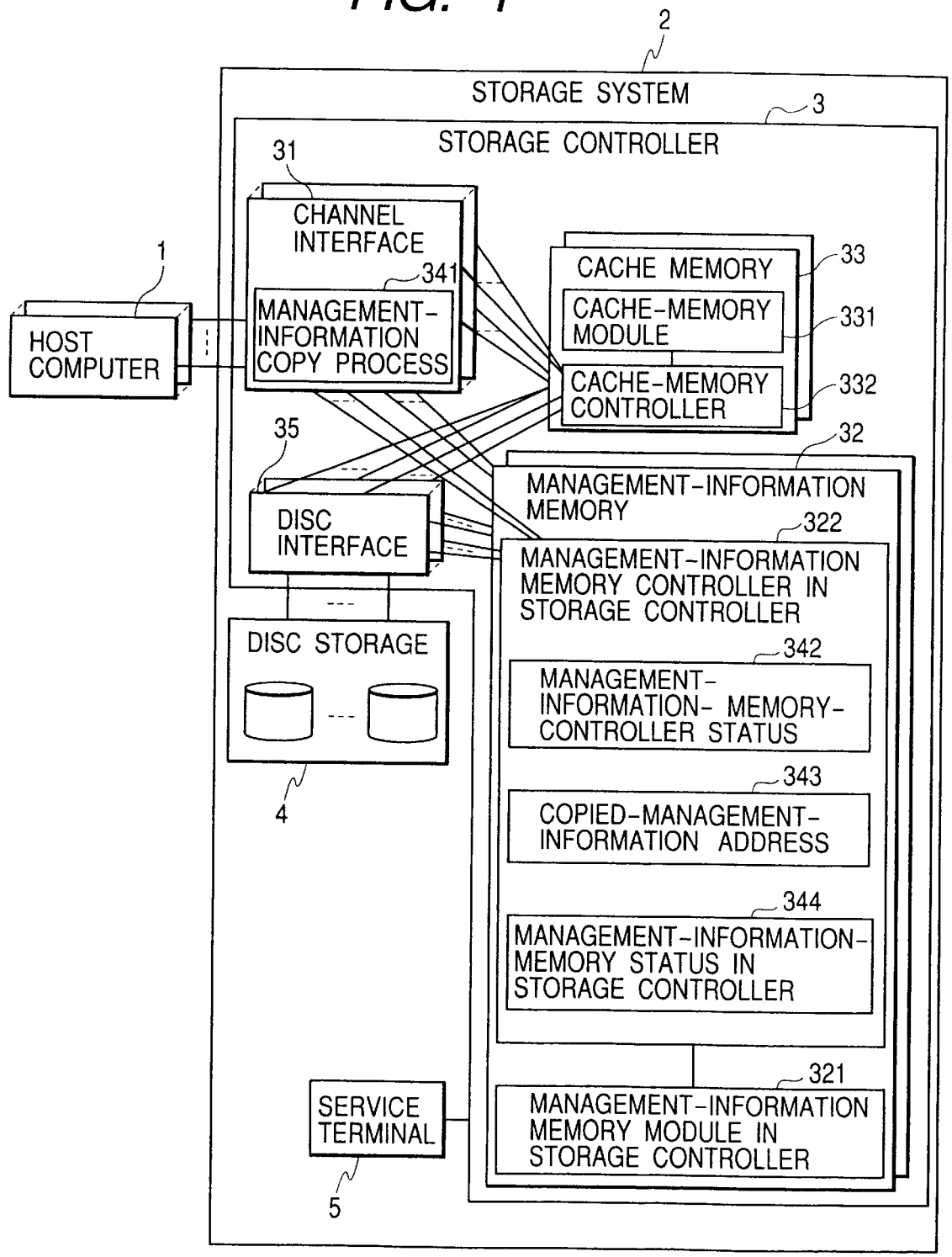
FIG. 1 is a diagram showing the configuration of a storage system including only one storage controller as implemented by a first embodiment of the present invention.
Figure 2:
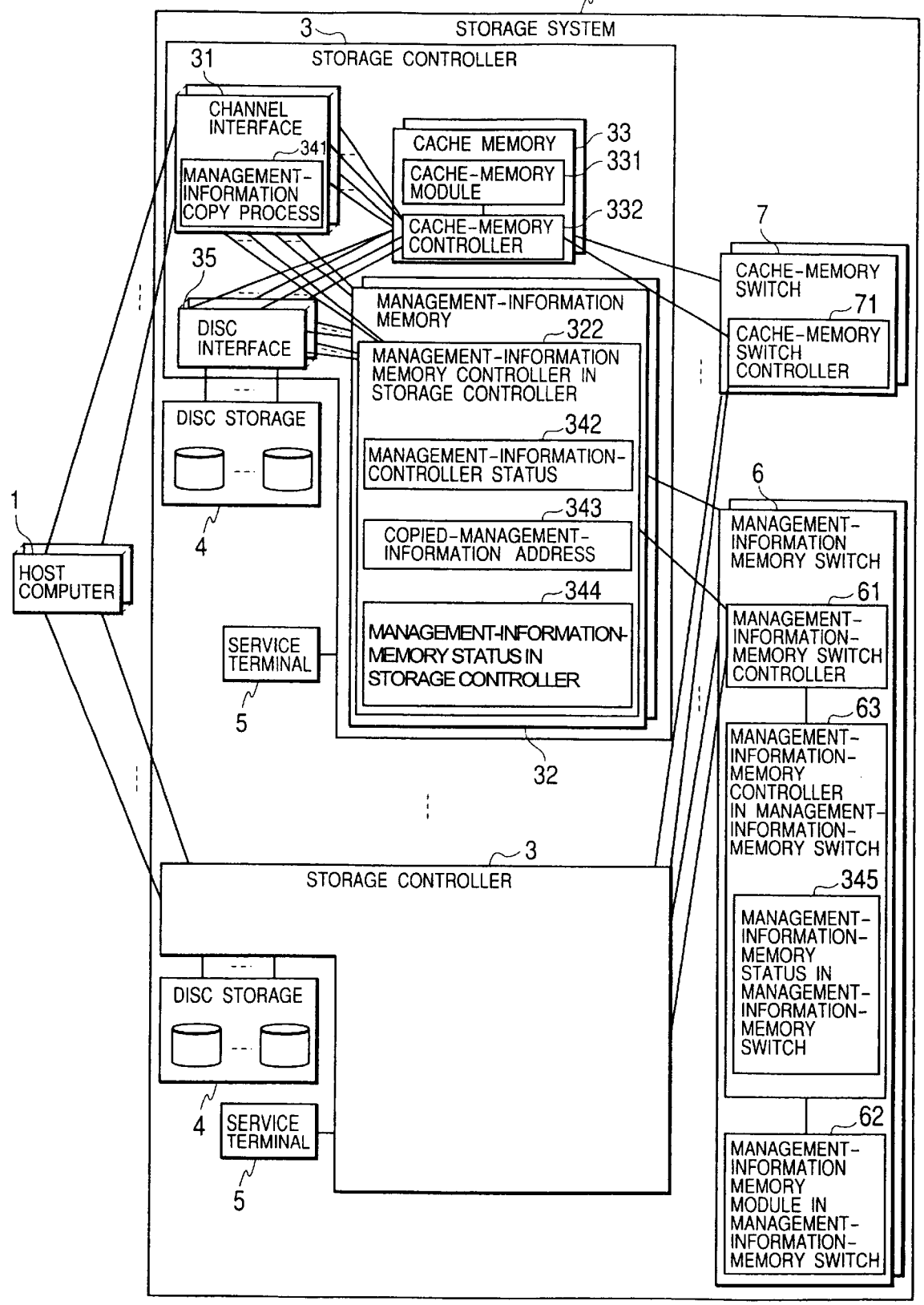
FIG. 2 is a diagram showing the configuration of a storage system including a plurality of storage controllers as implemented by the first embodiment of the present invention.

A first embodiment of the present invention is explained by referring to FIGS. 1 to 9.
(I): Configuration of the Storage System First of all, the configuration of the storage system is explained by referring to FIGS. 1 and 2. FIG. 1 is a diagram showing the configuration of a storage system 2 including only one storage controller 3 as implemented by a first embodiment of the present invention. On the other hand, FIG. 2 is a diagram showing the configuration of a storage system 2 including a plurality of storage controllers 3 as implemented by the first embodiment of the present invention.

The storage system 2 shown in FIG. 1 includes a storage controller 3 connected to a host computer 1. The storage controller 3 is also connected to a disc storage 4 and a service terminal 5. The disc storage 4 is a hard disc having a large storage capacity. The service terminal 5 is used by the user for entering a command to the storage controller 3 and displaying internal status of the storage controller 3.

The storage controller 3 comprises a channel interface 31, a disc interface 35, a management-information memory 32 and a cache memory 33. Each member of the storage controller 3 is a duplicated-component member comprising 2 identical components connected to each other by a path to increase reliability.

The channel interface 31 is a member connected to the host computer 1 whereas the disc interface 35 is a member connected to the disc storage 4. The management-information memory 32 is a nonvolatile memory for storing management information required for controlling the storage system 2.

The cache memory 33 is a memory for temporarily storing data in order to improve performance of the host computer 1 in an operation to make an access to the disc storage 4.

The channel interface 31 carries out a management-information copy process 341 to copy management information from a normal management-information memory 32 serving as one of the 2 identical components when the management-information memory 32 serving as the other identical component is undergoing a recovery process. Such a management-information copy process can also be carried out by the disc interface 35.

The management-information memory 32 comprises a controller-internal management-information memory module 321 for storing management information and a controller-internal management-information memory controller 322 for controlling the controller-internal management-information memory module 321.

The controller-internal management-information memory module 321 is a memory module for storing management information of the storage system 2.

The controller-internal management-information memory controller 322 includes management-information-memory-controller status 342, a copied-management-information address 343 and management-information-memory status 344.

The management-information-memory-controller status 342 is information for managing an access target in an operation to read out or write management information. The management-information-memory status 344 is information on the status of the management-information memory 32. The copied-management-information address 343 is used for managing the progress of the management-information copy process 341 to copy management information.

The cache memory 33 has a cache memory module 331 for storing data and a cache memory controller 332 for controlling the cache memory module 331.

The storage system 2 shown in FIG. 2 includes a plurality of storage controllers 3, serving as an upgraded version of the storage system 2 shown in FIG. 1. Each of the storage controllers 3 is also connected to a disc storage 4 and a service terminal 5.

The functions of members included in the configuration of the storage controller 3 are the same as those shown in FIG. 1. Each of the members is also a duplicated-component member comprising 2 identical components connected to each other by a path in the same way as the storage system 2 shown in FIG. 1.

In the configuration including a plurality of storage controllers 3, a cache-memory switch 7 and a management-information-memory switch 6 are provided externally to the storage controllers 3. The cache-memory switch 7 is a switch for connecting the storage controller 3 to a selected one of the cache memories 33. By the same token, the management-information-memory switch 6 is a switch for connecting the storage controller 3 to a selected one of the management-information memories 32.

The cache-memory switch 7 includes a cache-memory-switch controller 71 connected to the cache-memory controller 332 employed in the cache memory 33 of the storage controller 3.

The management-information-memory switch 6 comprises a management-information-memory-switch controller 61, a switch-internal management-information memory module 62 and a switch-internal management-information-memory controller 63. The management-information-memory-switch controller 61 is connected to the controller-internal management-information memory controller 322.

The switch-internal management-information memory module 62 is a memory module for storing management information.

The switch-internal management-information memory controller 63 is a member for controlling the switch-internal management-information memory module 62. The switch-internal management-information memory controller 63 includes management-information-memory status 345. The management-information-memory status 345 is status of management information stored in the management-information-memory switch 6. The management-information-memory status 345 is controlled so that the management-information-memory status 345 always matches the management-information-memory status 344 included in the controller-internal management-information memory controller 322 employed in the storage controller 3.

The management-information memory 32 is a duplicated-component memory comprising pairs each consisting of identical components. By the same token, the cache memory 33 is a duplicated-component memory comprising pairs each consisting of identical components. For these reasons, in actuality, a pair of cache-memory switches 7 and a pair of management-information-memory switches 6 are required.

A relation between the configuration of the storage system 2 and implementation members of management information is explained as follows.

In the case of a storage system 2 comprising only one storage controller 3, management information is stored in the controller-internal management-information memory module 321 of the management-information memory 32 employed in the storage controller 3 shown in FIG. 1. In a storage system 2 comprising only one storage controller 3, neither the management-information-memory switch 6 nor the cache-memory switch 7 is required. By eliminating the management-information-memory switch 6 and the cache-memory switch 7, the cost of the storage system 2 can be reduced.

In the case of a storage system 2 comprising a plurality of storage controllers 3, on the other hand, management information is stored in the management-information memory module 62 employed in the management-information-memory switch 6 shown in FIG. 2 in order to assure performance of making an access to the management information. Thus, the management-information memory module 321 employed in each of the storage controllers 3 is not required.

(II): Procedure for Changing the Configuration of the Storage System

The following description explains a procedure for changing the configuration of the storage system 2 implemented by this embodiment by referring to flowcharts shown in FIGS. 3 and 4.

FIG. 3 is a flowchart representing a procedure for installing additional storage controllers 3 and disc storages 4 in the storage system 2 implemented by the first embodiment of the present invention. On the other hand, FIG. 4 is a flowchart representing a procedure for removing storage controllers 3 and disc storages 4 from the storage system 2 implemented by the first embodiment of the present invention. The description begins with an explanation of the procedure for installing additional storage controllers 3 and disc storages 4 in the storage system 2 with reference to the flowchart shown in FIG. 3.

The flowchart shown in FIG. 3 begins with a step S301 to determine whether the storage system 2 includes only one storage controller 3. If the storage system 2 includes more than one storage controller 3, the flow of the procedure goes on to a step S306. If the storage system 2 includes only one storage controller 3, on the other hand, the flow of the procedure goes on to a step S302 at which a management-information-memory switch 6 and a cache-memory switch 7 are prepared and connected to the existing storage controller 3. Since a management-information-memory switch 6 and a cache-memory switch 7 are not used so far, it is necessary to newly install them.

The flow of the procedure then goes on to a step S303 to determine whether the management-information memory module 62 employed in the management-information-memory switch 6 has a storage capacity large enough for accommodating management information stored in the management-information memory module 321 employed in the existing storage controller 3. If the storage capacity is sufficient, the flow of the procedure goes on to a step S305.

If the storage capacity is not sufficient, on the other hand, the flow of the procedure goes on to a step S304 at which additional management-information memory modules 62 are installed in the management-information-memory switch 6 to provide a storage capacity large enough for accommodating management information stored in the management-information memory module 321 employed in the existing storage controller 3.

Then, at the next step S305, management information is copied from the management-information memory module 321 employed in the storage controller 3 to the additional management-information memory modules 62 employed in the management-information-memory switch 6. This copy process will be explained later by referring to flowcharts shown in FIGS. 5 and 6.

Subsequently, at the next step S306, an additionally installed disc storage 4 is connected to an additionally installed storage controller 3, and the additionally installed storage controller 3 is connected to the management-information-memory switch 6 and the cache-memory switch 7.

The flow of the procedure then goes on to a step S307 to determine whether the management-information-memory switch 6 has a storage capacity large enough for the installed additional disc storage 4 and the installed additional storage controller 3. If the storage capacity is large enough, the flow of the procedure goes on to a step S309. If the storage capacity is not large enough, on the other hand, the flow of the procedure goes on to a step S308 at which additional management-information memory modules 62 are installed in the management-information-memory switch 6 to provide a storage capacity large enough for the installed additional disc storage 4 and the installed additional storage controller 3.

Then, at the next step S309, management information for using the additionally installed disc storage 4 and the additionally installed storage controller 3 is developed in the management-information memory module 62 employed in the management-information-memory switch 6.

Finally, at the last step S310, use of the additionally installed disc storage 4 and the additionally installed storage controller 3 is started.

The description continues to an explanation of the procedure for removing storage controllers 3 and disc storages 4 from the storage system 2 with reference to the flowchart shown in FIG. 4. The flowchart shown in FIG. 4 begins with a step S401 to end use of a disc storage 4 and a storage controller 3, which are to be removed.

Then, at the next step S402, management information required for using the disc storage 4 and the storage controller 3, which are to be removed, is deleted from the management-information memory module 62 employed in the management-information-memory switch 6. This procedure is executed in the same way as deletion of a storage, a channel interface and a disc interface from the conventional storage system.

The flow of the procedure then goes on to a step S403 to determine whether the management-information memory module 62 employed in the management-information-memory switch 6 has a memory no longer required due to the removal of the disc storage 4 and the storage controller 3. If the management-information memory module 62 employed in the management-information-memory switch 6 does not have such a memory, the flow of the procedure goes on to a step S405. If the management-information memory module 62 employed in the management-information-memory switch 6 includes such a memory, on the other hand, the flow of the procedure goes on to a step S404 to remove management-information memory modules 62, which constitute the memory no longer required due to the removal of the disc storage 4 and the storage controller 3, from the management-information-memory switch 6.

Then, at the next step S405, the storage controller 3 to be removed is disconnected from the management-information-memory switch 6 and the cache-memory switch 7. The flow of the procedure subsequently goes on to a step S406 to determine whether only one storage controller 3 remains in the storage system 2 as a result of the removals. If more than one storage controller 3 remains in the storage system 2 as a result of the removals, the execution of the procedure is ended. If only one storage controller 3 remains in the storage system 2 as a result of the removals, on the other hand, the flow of the procedure goes on to a step S407 to determine whether the management-information memory module 321 employed in the remaining storage controller 3 has a storage capacity large enough for accommodating management information stored in the management-information memory module 62 employed in the management-information-memory switch 6. This determination is required since management information will be transferred from the management-information memory module 62 employed in the management-information-memory switch 6 to the management-information memory 32 employed in the remaining storage controller 3. If the storage capacity is large enough, the flow of the procedure goes on to a step S409. If the storage capacity is not large enough, on the other hand, the flow of the procedure goes on to a step S408 at which additional management-information memory modules 321 are installed in the storage controller 3 to provide a storage capacity large enough for accommodating management information stored in the management-information memory module 62 employed in the management-information-memory switch 6.

Then, at the next step S409, management information is copied from the management-information memory module 62 employed in the management-information-memory switch 6 to management-information memory modules 321 employed in the storage controller 3. This copy process will be explained later by referring to flowcharts shown in FIGS. 5 and 6.

Finally, at the step S410, the remaining storage controller 3 is disconnected from the management-information-memory switch 6 and the cache-memory switch 7.

(III): Details of the Management-Information Copy Process and Process to Access Management Information The following description explains a process 341 to copy management information and a process to make an access to management information by referring to flowcharts shown in FIGS. 5 to 7.

FIG. 5 is a flowchart representing a procedure for copying management information when installing or removing storage controllers 3 and disc storages 4 in or from the storage system 2. FIG. 6 is a flowchart representing a management-information copy process 341 carried out in a channel interface 31.

FIG. 7 is a flowchart representing a procedure followed by the channel interface 31 carrying out processing other than the management-information copy process 341 and a disc interface 35 for making an access to management information.

Before details of procedures related to management information are explained, preparatory concepts and cautions are described.

In this embodiment, in order to assure reliability, each member of the storage controller 3 is designed into a duplicated-component configuration comprising 2 identical components. In order to keep up with such duplicated-component configurations, the management-information-memory switch 6 and the cache-memory switch 7 are each also designed into a duplicated-component configuration comprising 2 identical components. Members of the storage controller 3 include the channel interface 31, the disc interface 35, the management-information memory 32, the cache memory 33.

Thus, when management information is copied from the management-information memory 32 to the management-information-memory switch 6, for example, the copy process must be carried out from the 2 identical components of the management-information memory 32 to respectively the 2 identical components of the management-information-memory switch 6. Thus, attention needs to be paid to the fact that, if management information in one of the 2 identical components of a member employed in the storage controller 3 cannot be referenced while the same management information in the other component can be referenced, the operation of the storage controller 3 does not have to be halted. A caution also needs to be exercised in a process to copy management information since an operation to update the management information during the copy process may cause data integrity to be lost.

Status of a management-information memory is defined for controlling a process to copy management information and other processing. Three defined kinds of status are 'Normal', 'Blocked', and 'Being copied'. The Normal status means that management information stored in a management-information memory can be referenced and used. The Blocked status indicates that management information stored in a management-information memory cannot be referenced. The 'Being-copied' status implies that management information stored in a management-information memory is being copied.

It should be noted that, while all management information is assumed to be duplicated in the 2 identical memory components in this embodiment for the sake of simplicity, a case in which not all management information is duplicated is also included in the scope of the present invention. Management information, that cannot be referenced and updated but can be processed without halting the operation of the storage controller 3, does not have to be made an object of the management-information copy process 341.

Control needs to be executed so that, with the management-information-memory status 344 and the management-information-memory status 345 put in the Blocked status, such management information cannot be referenced or updated. By reconstruction of such management information before the management-information-memory status 344 and the management-information-memory status 345 are set to Normal, however, the reconstructed management information can be referenced and updated after the management-information-memory status 344 and the management-information-memory status 345 have been set to Normal.

The management-information-memory status is applicable to both the management-information memory controller 322 employed in the storage controller 3 and the management-information memory controller 63 employed in the management-information-memory switch 6. As described above, the controller-internal management-information memory controller 322 and the switch-internal management-information memory controller 63 each have a duplicated-component configuration comprising 2 identical components. It is necessary to establish in advance a rule requiring that the controller-internal management-information memory controller 322 serving as one of its 2 identical components shall always be put in the same management-information-memory status as the switch-internal management-information memory controller 63 serving as the one of its 2 identical components. By the same token, the controller-internal management-information memory controller 322 serving as the other identical component shall always be put in the same management-information-memory status as the switch-internal management-information memory controller 63 serving as the other identical component.

On the other hand, the management-information memory controller 322 employed in the storage controller 3 also has management-information-memory-controller status 342 indicating the storage location of management information to be accessed. The management-information-memory-controller status 342 applies to both the controller-internal management-information memory controller 322 serving as one of its 2 identical components and the controller-internal management-information memory controller 322 serving as its other identical component. The management-information-memory-controller status 342 may have a value of 'Accesses to management information in the management-information-memory switch' indicating that the controller-internal management-information memory controller 322 should make an access to management information in the management-information-memory switch 6. On the other hand, the management-information-memory-controller status 342 may also have a value of 'Accesses to management information in the storage controller' implying that the controller-internal management-information memory controller 322 should make an access to management information in the storage controller 3.

A management-information copy process 341 is represented by a flowchart shown in FIG. 5. As shown in the figure, the flowchart begins with a step S501 at which the management-information-memory status 344 of the storage controller 3 serving as one of its 2 identical components and the management-information-memory status 345 of the management-information-memory switch 6 serving as one of its 2 identical components are put in the Block status from the service terminal 5. Thus, attention needs to be paid to the fact that the management-information-memory status 344 of the storage controller 3 and the management-information-memory status 345 of the management-information-memory switch 6 serving have been put in the Block status.

The Blocked status prevents the channel interface 31 and the disc interface 35 from referencing and updating management information.

Even if the management-information-memory status 344 of the storage controller 3 serving as one of its 2 identical components and the management-information-memory status 345 of the management-information-memory switch 6 serving as one of its 2 identical components are put in the Block status, the storage system 2 is capable of continuing its operation by using management information stored in the management-information memory module 321 employed in the storage controller 3 serving as its other identical component or the management-information memory module 62 employed in the management-information-memory switch 6 serving as its other identical components.

The flow of the management-information copy procedure then goes on to a step S502 to determine whether the direction to copy management information is from the storage controller 3 to the management-information-memory switch 6.

A direction to copy management information from the storage controller 3 to the management-information-memory switch 6 indicates that storage controllers 3 are newly added to the storage system 2 so that the storage system 2 is changed from a configuration with only one storage controller 3 to a configuration having a plurality of storage controllers 3. In this case, the management-information-memory switch 6 is also newly added. On the contrary, a direction to copy management information from the management-information-memory switch 6 to the storage controller 3 indicates that storage controllers 3 are removed from the storage system 2 so that the storage system 2 is changed from a configuration having a plurality of storage controllers 3 to a configuration with only one storage controller 3. In this case, the management-information-memory switch 6 is also eliminated.

If the direction to copy management information is from the storage controller 3 to the management-information-memory switch 6, the flow of the management-information copy process goes on to a step S503 at which the management-information-memory-controller status 342 of the controller-internal management-information memory controller 322 in the blocked storage controller 3 is changed from 'Accesses to management information in the storage controller' to 'Accesses to management information in the management-information-memory switch' from the service terminal 5. This is because the management-information-memory-controller status 342 will be referred to for determining whether management information in the controller-internal management-information memory module 321 or the switch-internal management-information memory module 62 is to be referenced or updated after the management-information copy process 341 is completed. By changing the value of the management-information-memory-controller status 342 in the blocked storage controller 3 as described above, the controller-internal management-information memory controller 322 of the storage controller 3 will thereafter direct a request for an access to management information to the management-information-memory switch 6.

If the direction to copy management information is from the management-information-memory switch 6 to the storage controller 3, on the other hand, the flow of the management-information copy process goes on to a step S504 at which the management-information-memory-controller status 342 of the controller-internal management-information memory controller 322 in the blocked storage controller 3 is changed from 'Accesses to management information in the management-information-memory switch' to 'Accesses to management information in the storage controller' from the service terminal 5. As described above, the management-information-memory-controller status 342 will be referred to for determining whether management information in the controller-internal management-information memory module 321 or the switch-internal management-information memory module 62 is to be referenced or updated after the management-information copy process 341 is completed. By changing the value of the management-information-memory-controller status 342 in the blocked storage controller 3 as described above, the controller-internal management-information memory controller 322 of the storage controller 3 will thereafter direct a request for an access to management information to the storage controller 3.

Then, at the next step S505, the management-information-memory status 344 of the blocked storage controller 3 and the management-information-memory status 345 of the blocked management-information-memory switch 6 are put in Being-copied status, and management-information copy process 341 is started from the service terminal 5. Details of the management-information copy process 341 will be described by referring to a flowchart shown in FIG. 6.

The flow of the management-information copy procedure then goes on to a step S506 to wait for the management-information copy process 341 to be completed. Then, at the next step S507, the management-information-memory status 344 and the management-information-memory status 345, which were put in the Being-copied status, are verify to have been restored to the Normal status.

At this point of time, management information has been copied from the management-information memory module 321 employed in the blocked storage controller 3 having a duplicated-component configuration to the management-information memory module 62 employed in the unblocked management-information-memory switch 6 also having a duplicated-component configuration, or management information has been copied from the management-information memory module 62 employed in the blocked management-information-memory switch 6 having a duplicated-component configuration to the management-information memory module 321 employed in the unblocked storage controller 3 also having a duplicated-component configuration.

Then, at the next step S508, the management-information-memory status 344 of the storage controller 3 serving as the other identical component and the management-information-memory status 345 of the management-information-memory switch 6 serving as the other identical component are put in the Block status. Subsequently, pieces of processing are carried out at steps S509 to S514 in the same way as the steps S502 to S507 respectively.

Finally, management information is all copied from the duplicated-component configuration of the controller-internal management-information memory module 321 to the duplicated-component configuration of the switch-internal management-information memory module 62, or management information is all copied from the duplicated-component configuration of the switch-internal management-information memory module 62 to the duplicated-component configuration of the controller-internal management-information memory module 321.

Next, a detailed procedure of the management-information copy process 341 is explained by referring to a flowchart shown in FIG. 6. The management-information copy process 341 is carried out at the steps S505 and S512 of the flowchart shown in FIG. 5. In addition, the management-information copy process 341 is also carried out for recovering the management-information memory 32.

The flowchart representing the management-information copy process 341 begins with a step S601 at which the address 343 of copied management information is to point to the beginning of a management-information copy destination. The flow of the procedure then goes on to a step S602 to determine whether the address 343 of copied management information has reached the end of the management-information copy destination. If the address 343 of copied management information has reached the end of the management-information copy destination, the flow of the procedure goes on to a step S606 at which pieces of management-information memory status 344 and 345 are changed from 'Being copied' to 'Normal'. Then, the management-information copy process 341 is ended.

If the address 343 of copied management information has not reached the end of the management-information copy destination, on the other hand, the flow of the procedure goes on to a step S603 at which management information of a predetermined amount is read out from the controller-internal management-information memory module 321 in 'Normal' management-information memory status 344 and written into the switch-internal management-information memory module 62 in 'Being-copied' management-information memory status 345, or read out from the switch-internal management-information memory module 62 in 'Normal' management-information memory status 345 and written into the controller-internal management-information memory module 321 in 'Being-copied' management-information memory status 344.

Then, at the next step S604, the address 343 of copied management information is incremented by an increase corresponding to the amount of copied management information. Subsequently, at the next step S605, the management-information copy process 341 is suspended for a predetermined period of time in order to reduce the degradation of performance to process a read or write request which is made by the host computer 1 in the course of the management-information copy process 341. The flow of the procedure then goes back to the step S602.

The following description explains a procedure followed by the channel interface 31 carrying out processing other than the management-information copy process 341 and a disc interface 35 for making an access to management information by referring to a flowchart shown in FIG. 7

In this processing, it is important not to lose integrity of management information being copied when updating management information.

As described above, attention needs to be paid to the fact that the management-information-memory-controller status 342 of the controller-internal management-information memory controller 322 indicates whether management information in the controller-internal management-information memory module 321 or management information in the switch-internal management-information memory module 62 is to be accessed. Thus, in the following description of the flowchart shown in FIG. 7, the management-information-memory status 344 also represents the management-information-memory status 345 and the management-information memory module represents either the controller-internal management-information memory module 321 or the switch-internal management-information memory module 62.

The flowchart begins with a step S701 at which the management-information-memory status 344 of the management-information memory module serving as one of the 2 identical components and the management-information-memory status 344 of the management-information memory module serving as the other identical component can be referenced. The flow of the procedure then goes on to a step 702 to determine whether the management-information-memory status 344 of the management-information memory module serving as one of the 2 identical components and the management-information-memory status 344 of the management-information memory module serving as the other identical component are normal.

If the management-information-memory status 344 of the management-information memory module serving as one of the 2 identical components and the management-information-memory status 344 of the management-information memory module serving as the other identical component are found normal, the flow of the procedure goes on to a step S703 at which pieces of management information in both the management-information memory module serving as one of the 2 identical components and the management-information memory module serving as the other identical component are accessed.

If the management-information-memory status 344 of the management-information memory module serving as one of the 2 identical components and the management-information-memory status 344 of the management-information memory module serving as the other identical component are found not both normal, on the other hand, the flow of the procedure goes on to a step S704 to determine whether the management-information-memory status 344 of non-normal management-information memory module 321 is Being-copied.

If the management-information-memory status 344 of non-normal management-information memory module 321 is not Being-copied, the flow of the procedure goes on to a step S705 at which management information in the management-information memory module 321 in Normal status is accessed. If the management-information-memory status 344 of non-normal management-information memory module 321 is Being-copied, on the other hand, the flow of the procedure goes on to a step S706 at which the address 343 of copied management information is referenced. Then, the flow of the procedure goes on to a step S707 to determine whether the access request is a write request and whether the address of the access target lies ahead of the address 343 of copied management information. An address of the access target lying ahead of the address 343 of copied management information indicates that the access is an access to a region for which a copy operation has already been completed. This is because a copy operation starts from a start address toward subsequent addresses.

If at least the access request is not a write request or the address of the access target does not lie ahead of the address 343 of copied management information, the flow of the procedure goes on to the step S705. Such an access request is a request to read out data or a request to write data which, in this case, needs to be merely written into the copy source only. If the access request is a write request and the address of the access target lies ahead of the address 343 of copied management information, on the other hand, the flow of the procedure goes on to a step S708 at which management information is written into both the management-information memory modules serving as the copy source and the copy destination. The processing of the step S708 is carried out in order to maintain integrity of duplicated pieces of identical management information at the end of the management-information copy process 341. That is, the write operation is carried out also on the copy destination. The management information is thus written into a copy destination in the Being-copied status. The copy destination is also determined by the value of the management-information-memory-controller status 342

(IV): Data Flows of the Management-Information Copy Process and outline of the Management-Information Copy Process The following description explains data flows of the management-information copy process and an outline of the management-information copy process by referring to FIGS. 8 and 9.

FIG. 8 is a diagram showing a model representing flows of data in a process to copy management information and an outline of the copy process in the first embodiment of the present invention wherein the management information is copied from a management-information memory module 321 employed in a management-information memory 32 to a management-information memory module 62 employed in a management-information-memory switch 6.

On the other hand, FIG. 9 is a diagram showing a model representing flows of data in a process to copy management information and an outline of the copy process in the first embodiment of the present invention wherein the management information is copied from a management-information memory module 62 employed in a management-information-memory switch 6 to a management-information memory module 321 employed in a management-information memory 32.

The model shown in FIG. 8 represents a process to copy management information from a management-information memory module 321 employed in a management-information memory 32 to a management-information memory module 62 employed in a management-information-memory switch 6. Such a management-information copy process is carried out when storage controllers 3 are newly installed in the storage system 2 to change the storage system 2 from a configuration comprising one storage controller 3 to a configuration comprising a plurality of storage controllers 3. When such storage controllers 3 are newly added, the management-information-memory switch 6 is also newly installed as well.

The management-information memory 32 shown on the upper side of each of FIGS. 8(a) to 8(d) is a duplicated-component member comprising 2 identical components represented by symbols A and B. By the same token, the management-information-memory switch 6 shown on the lower side of each of FIGS. 8(a) to 8(d) is a duplicated-component member comprising 2 identical components represented by symbols A and B. As described above, the management-information memory 32 includes the controller-internal management-information memory module 321 and the management-information-memory switch 6 has the switch-internal management-information memory module 62 as shown in the figure. A phrase written beside the controller-internal management-information memory module 321 or the switch-internal management-information memory module 62 in each of FIGS. 8(a) to 8(d) describes the management-information memory status 344 or 345 of the controller-internal management-information memory module 321 or the switch-internal management-information memory module 62. A phrase written outside boxes of each of FIGS. 8(a) to 8(d) describes the management-information memory controller status 342 of the storage controller 3.

Since FIG. 8 is a diagram showing flows of data and an outline of processing, the figure does not show configuration elements other than the flows and the outline. In the following description, the phrase "management information is stored in the management-information memory 32" or "management information is stored in the storage controller 3" means that the management information is stored in the management-information memory module 321 employed in the management-information memory 32 of the storage controller 3. By the same token, the phrase "management information is stored in the management-information-memory switch 6" means that the management information is stored in the management-information memory module 62 employed in the management-information-memory switch 6. In addition, an A system comprises an A management-information memory 32 and an A management-information memory switch 6. Likewise, a B system comprises a B management-information memory 32 and a B management-information memory switch 6.

Figure 8A:
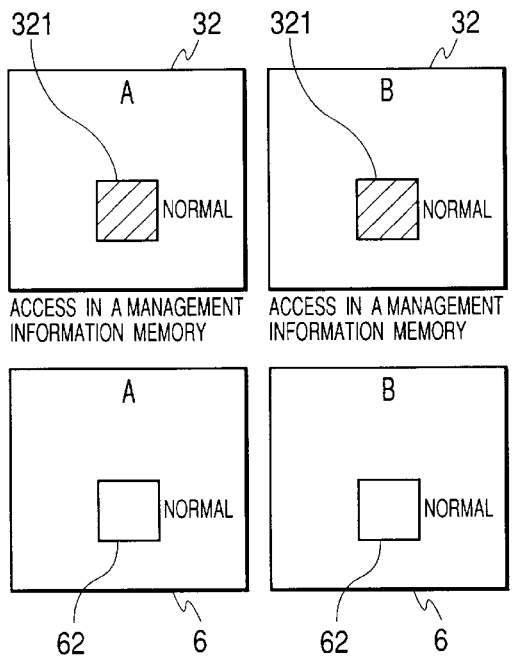

To begin with, in an initial state shown in FIG. 8(a), pieces of management information of the A and B systems are both stored in the A and B management-information memories 32 respectively. The A and B management-information memories 32 both have management-information memory status 344 of Normal. As described earlier, the A management-information memory 32 and the A management-information memory switch 6 have the same management-information memory status, whereas the B management-information memory 32 and the B management-information memory switch 6 have the same management-information memory status. In the initial state, the A and B systems both have management-information memory controller status 342 of "Accesses to management information in storage controller." With this status, the storage controller 3 makes accesses to management information stored in the management-information memory 32.

Figure 8B:
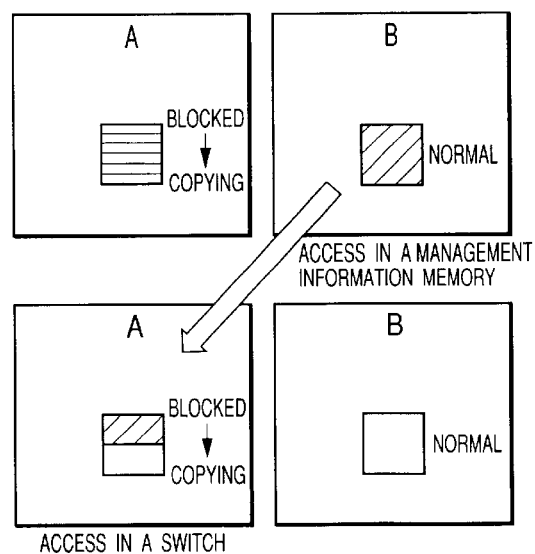

In a management-information copy process 341, first of all, the A system is put in a Blocked management-information memory status as shown in FIG. 8(b) at the step S501 of the flowchart shown in FIG. 5. With such status, the storage controller 3 is no longer allowed to use management information stored in the A system.

Then, the management-information memory controller status 342 of the A system is changed to "Accesses to management information in the management-information memory switch" at the step S503 of the flowchart shown in FIG. 5, and the management-information memory status of the A system is changed to "Being copied" before the management-information copy process is started at the step S505 of the flowchart shown in FIG. 5. The copy source of the management-information copy process is the B management-information memory 32. This copy source agrees with the Normal management-information memory status of the B system and the "Accesses to management information in the management-information memory switch" management-information memory controller status 342 of the B system. On the other hand, the copy destination of the management-information copy process is the A management-information memory switch 6. This copy destination agrees with the "Being copied" management-information memory status of the A system and results of the management-information copy process 341 will reflect the fact that the management-information memory controller status 342 of the A system has been changed to "Accesses to management information in the management-information memory switch." Thus, management information is copied from the B management-information memory 32 to the A management-information memory switch 6 at the step S603 of the flowchart shown in FIG. 6.

Figure 8C:
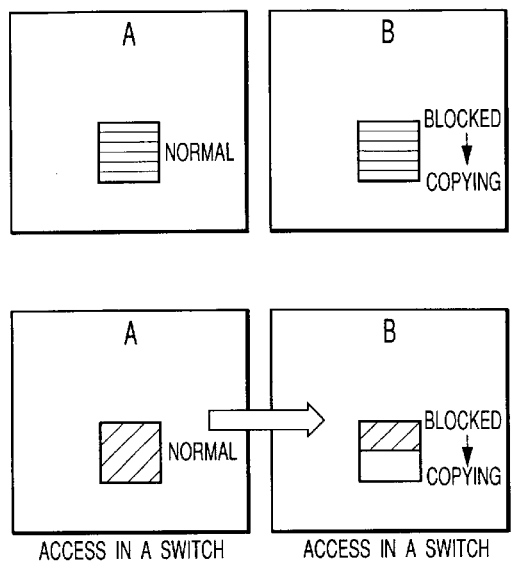

As the copy operation is completed, the management-information memory status of the A system is restored to "Normal" at the step S606 of the flowchart shown in FIG. 6 while the management-information memory status of the B system is changed to "Blocked" at the step S508 of the flowchart shown in FIG. 5 as shown in FIG. 8(c).

Then, the management-information memory controller status 342 of the B system is changed to "Accesses to management information in the management-information memory switch" at the step S510 of the flowchart shown in FIG. 5, and the management-information memory status of the B system is changed to "Being copied" before a second copy operation is started at the step S512 of the flowchart shown in FIG. 5. The copy source of the second copy operation is the A management-information memory switch 6. This copy source agrees with the Normal management-information memory status of the A system and the "Accesses to management information in the management-information memory switch" management-information memory controller status 342 of the A system. On the other hand, the copy destination of the management-information copy process is the B management-information memory switch 6. This copy destination agrees with the "Being copied" management-information memory status of the B system and results of the management-information copy process 341 will reflect the fact that the management-information memory controller status 342 of the B system has been changed to "Accesses to management information in the management-information memory switch." Thus, management information is copied from the A management-information memory switch 6 to the B management-information memory switch 6 at the step S603 of the flowchart shown in FIG. 6.

Figure 8D:
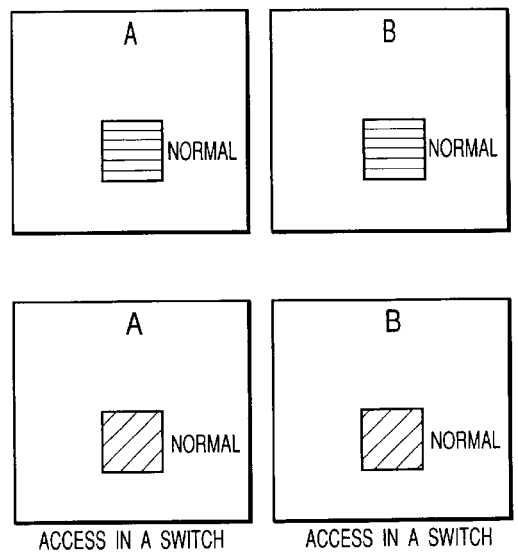

As this second copy operation is completed, the management-information memory status of the B system is restored to "Normal" at the step S606 of the flowchart shown in FIG. 6 as shown in FIG. 8(d). In the state shown in FIG. 8(d), the storage controller 3 is capable of operating by making accesses to management information stored in the management-information memory switch 6 having a duplicated-component configuration.

Next, the model shown in FIG. 9 represents a process to copy management information from a management-information memory module 62 employed in a management-information-memory switch 6 to a management-information memory module 321 employed in a management-information memory 32. Such a management-information copy process is carried out when storage controllers 3 are removed from the storage system 2 to change the storage system 2 from a configuration comprising a plurality of storage controllers 3 to a configuration comprising only one storage controller 3. When storage controllers 3 are removed as such, the management-information-memory switch 6 is also removed as well.

To begin with, in an initial state shown in FIG. 9(a), pieces of management information of the A and B systems are both stored in the A and B management-information memory switches 6 respectively. The A and B management-information memory switches 6 both have management-information memory status 345 of Normal. As described earlier, the A management-information memory 32 and the A management-information memory switch 6 have the same management-information memory status, whereas the B management-information memory 32 and the B management-information memory switch 6 have the same management-information memory status. In the initial state, the A and B systems both have management-information memory controller status 342 of "Accesses to management information in the management-information memory switch." With this status, the storage controller 3 makes accesses to management information stored in the management-information memory switch 6.

In a management-information copy process 341, first of all, the A system is put in a Blocked management-information memory status as shown in FIG. 9(b) at the step S501 of the flowchart shown in FIG. 5. With such status, the storage controller 3 is no longer allowed to use management information stored in the A system.

Then, the management-information memory controller status 342 of the A system is changed to "Accesses to management information in the storage controller" at the step S504 of the flowchart shown in FIG. 5, and the management-information memory status of the A system is changed to "Being copied" before the management-information copy process is started at the step S505 of the flowchart shown in FIG. 5. The copy source of the management-information copy process is the B management-information memory switch 6. This copy source agrees with the Normal management-information memory status of the B system and the "Accesses to management information in the management-information switch" management-information memory controller status 342 of the B system. On the other hand, the copy destination of the management-information copy process is the A management-information memory 32. This copy destination agrees with the "Being copied" management-information memory status of the A system and results of the management-information copy process 341 will reflect the fact that the management-information memory controller status 342 of the A system has been changed to "Accesses to management information in the storage controller." Thus, management information is copied from the B management-information memory switch 6 to the A management-information memory 32 at the step S603 of the flowchart shown in FIG. 6.

As the copy operation is completed, the management-information memory status of the A system is restored to "Normal" at the step S606 of the flowchart shown in FIG. 6 while the management-information memory status of the B system is changed to "Blocked" at the step S508 of the flowchart shown in FIG. 5 as shown in FIG. 9(c).

Then, the management-information memory controller status 342 of the B system is changed to "Accesses to management information in the storage controller" at the step S511 of the flowchart shown in FIG. 5, and the management-information memory status of the B system is changed to "Being copied" before a second copy operation is started at the step S512 of the flowchart shown in FIG. 5. The copy source of the second copy operation is the A management-information memory 32. This copy source agrees with the Normal management-information memory status of the A system and the "Accesses to management information in the storage controller" management-information memory controller status 342 of the A system. On the other hand, the copy destination of the management-information copy process is the B management-information memory 32. This copy destination agrees the "Being copied" management-information memory status of the B system and results of the management-information copy process 341 will reflect the fact that the management-information memory controller status of the B system has been changed to "Accesses to management information in the storage controller." Thus, management information is copied from the A management-information memory 32 to the B management-information memory 32 at the step S603 of the flowchart shown in FIG. 6.

As this second copy operation is completed, the management-information memory status of the B system is restored to "Normal" at the step S606 of the flowchart shown in FIG. 6 as shown in FIG. 9(d). In the state shown in FIG. 9(d), the storage controller 3 is capable of operating by making accesses to management information stored in the management-information memory 32 having a duplicated-component configuration.

Second Embodiment

Next, a second embodiment of the present invention is explained by referring to FIGS. 10 to 14.

In this embodiment, the explanation of things common to the first embodiment is not repeated. Instead, the second embodiment is explained by focusing on technological differences from the first embodiment.

(I): Configuration of the Storage System

First of all, the configuration of the storage system 2 implemented by the second embodiment is explained by referring to FIGS. 10 and 11. FIG. 10 is a diagram showing the configuration of a storage system including only one storage controller 3 as implemented by the second embodiment of the present invention. On the other hand, FIG. 11 is a diagram showing the configuration of a storage system including a plurality of storage controllers 3 as implemented by the second embodiment of the present invention.

In the case of the first embodiment, the storage controller 3 as well as the management-information-memory switch 6 each have a duplicated-component configuration comprising 2 identical components and, when management information is copied from the storage controller 3 to the management-information-memory switch 6 or vice versa, one of the 2 identical components in the storage controller 3 and the counterpart of the 2 identical components in the management-information-memory switch 6 are put in Blocked status. Thus, in the course of a management-information copy process, the storage system 2 is capable of carrying out an operation without an interruption by using management information stored in an unblocked component. In consequence, the storage system 2 entails redundancy of the duplicated-component configurations of the storage controller 3 and the management-information-memory switch 6.

The storage system 2 implemented by this embodiment is capable of carrying out an operation without an interruption even without entailing the duplicated-component configurations of the storage controller 3 and the management-information-memory switch 6.

In the case of a storage system 2 including only one storage controller 3 as implemented by the second embodiment shown in FIG. 10, the storage system 2 is different from the first embodiment shown in FIG. 1 in that, in the case of the storage system 2 shown in FIG. 10, the management-information copy function 346 is carried out not by the channel interface 31, but by management-information memory controller 323 employed in the storage controller 3, and the management-information-memory status 344 is replaced by management-information copy information 347. The management-information copy information 347 is information including a copy direction and management-information memory status. The management-information copy information 347 can have 3 values, namely, "Copying management information from storage controller to management-information memory switch", "Copying management information from management-information memory switch to storage controller" and "Cleared". The Clear value means that no management-information copy function 346 is being carried out.

In the case of a storage system 2 including a plurality of storage controllers 3 as implemented by the second embodiment shown in FIG. 11, on the other hand, the storage system 2 is different from the first embodiment shown in FIG. 2 in that, in the case of the storage system 2 shown in FIG. 11, the management-information copy function 346 is carried out not by the channel interface 31, but by management-information memory controller 323 employed in the storage controller 3, the management-information-memory status 344 is replaced by management-information copy information 347 and the management-information-memory switch 6 has management-information copy information 348 which has always the same value as the management-information copy information 347.

It should be noted that, even though FIGS. 10 and 11 show the storage controller 3 as well as the management-information-memory switch 6 each having a duplicated-component configuration comprising 2 identical components as is the case of the first embodiment, the duplicated-component configurations may not necessarily be utilized in management-information copy function 346.

(II): Procedures for Changing the Configuration of the Storage System

A procedure for changing the configuration of the storage system implemented by the second embodiment is the same as that of the first embodiment explained earlier by referring to FIGS. 3 and 4. To be more specific, a procedure for adding new storage controllers 3 and new disc storages 4 to the storage system 2 is the same as that represented by the flowchart shown in FIG. 3. On the other hand, a procedure for removing storage controllers 3 and disc storages 4 from the storage system 2 is the same as that represented by the flowchart shown in FIG. 4.

(III): Details of Management-Information Copy Process and Process to Access Management Information The following description explains detailed procedures of a process to copy management information and a process to make an access to management information by referring to flowcharts shown in FIGS. 12 to 14. FIG. 12 is a flowchart representing a procedure for copying management information when installing or removing storage controllers 3 and disc storages 4 in or from the storage system 2. FIG. 13 is a flowchart representing a management-information copy function 346 carried out in the storage controller 3. FIG. 14 is a flowchart representing a procedure followed by the channel interface 31 and a disc interface 35 for making an access to management information.

The flowchart shown in FIG. 12 begins with a step S1001 at which the user enters a copy direction to management-information memory controller 323 employed in the storage controller 3 and activates the management-information copy function 346 via the service terminal 5. To be more specific, the user enters such a copy direction to the storage controller 3 so that, when the management-information-memory switch 6 is newly installed in the storage system 2, management information is copied from the storage controller 3 to the management-information-memory switch 6 and, when the management-information-memory switch 6 is removed from the storage system 2, on the other hand, management information is copied from the management-information-memory switch 6 to the storage controller 3.

Then, at the next step S1002, the storage system 2 enters a state of waiting for completion of the management-information copy function 346 carried out by management-information memory controller 323 employed in the storage controller 3.

Next, the management-information copy function 346 is explained by referring to a flowchart shown in FIG. 13. As shown in the figure, the flowchart begins with a step S1101 at which a copied-management-information address 343 is set to point to the beginning of the copy destination of management information. Then, the flow of the process goes on to a step S1102 to determine whether the direction of the process to copy management information is from the storage controller 3 to the management-information-memory switch 6. If the direction of the process to copy management information is from the storage controller 3 to the management-information-memory switch 6, the flow of the process goes on to a step S1103 at which the management-information copy information 348 of the management-information-memory switch 6 is changed to "Copying management information from the storage controller to the management-information-memory switch." Then, at the next step S1104, the management-information copy information 347 of the storage controller 3 is changed to "Copying management information from the storage controller to the management-information-memory switch."

If the direction of the process to copy management information is from the management-information-memory switch 6 to the storage controller 3, on the other hand, the flow of the process goes on to a step S1105 at which the management-information copy information 348 of the management-information-memory switch 6 is changed to "Copying management information from the management-information-memory switch to the storage controller." Then, at the next step S1106, the management-information copy information 347 of the storage controller 3 is changed to "Copying management information from the management-information-memory switch to the storage controller."

Then, the flow of the process goes on to a step S1107 to determine whether the address 343 of copied management information has reached the end of the management-information copy destination. If the address 343 of copied management information has reached the end of the management-information copy destination, the flow of the process goes on to a step S1111. If the address 343 of copied management information has not reached the end of the management-information copy destination, on the other hand, the flow of the process goes on to a step S1108 at which management information of a predetermined amount is copied from the controller-internal management-information memory module 321 or the switch-internal management-information memory module 62 serving as a copy source to respectively the switch-internal management-information memory module 62 or the controller-internal management-information memory module 321 serving as the copy destination.

Subsequently, the flow of the process goes on to a S1109 at which the address 343 of copied management information is updated. Then, at the next step S1110, the management-information copy function 346 is suspended for a predetermined period of time in order to prevent an access request made by the channel interface 31 or the disc interface 35 from being kept waiting for a long period of time. After a predetermined period of time has lapsed, the flow of the process goes back to the step S1107.

At the step S1111, the management-information copy information 347 of the storage controller 3 is cleared. Subsequently, at the next step S1112, the management-information copy information 348 of the management-information-memory switch 6 is cleared.

The flow of the process then goes on to a step S1113 to determine whether the direction of the process to copy management information is from the storage controller 3 to the management-information-memory switch 6. If the direction of the process to copy management information is from the storage controller 3 to the management-information-memory switch 6, the flow of the process goes on to a step S1114 at which the management-information memory controller status 342 is changed to "Accesses to management information in the management-information-memory switch." If the direction of the process to copy management information is from the management-information-memory switch 6 to the storage controller 3, on the other hand, the flow of the process goes on to a step S1115 at which the management-information memory controller status 342 is changed to "Accesses to management information in the storage controller."

The management-information-memory-controller status 342 indicates whether the storage controller 3 should make an access to management information stored in the storage controller 3 or the management-information-memory switch 6. Thus, after the management-information copy function 346 is completed, the storage controller 3 always makes accesses to management information stored in the copy destination.

FIG. 14 is a flowchart representing a procedure followed by the channel interface 31 and a disc interface 35 for making an access to management information.

As shown in the figure, the flowchart begins with a step S1201 to determine whether the management-information memory controller status 342 is "Accesses to management information in the storage controller." If the management-information memory controller status 342 is "Accesses to management information in the storage controller," the flow of the procedure goes on to a step S1202 to make a request for an access to management information in the controller-internal management-information memory module 321. If the management-information memory controller status 342 is "Accesses to management information in the management-information-memory switch," on the other hand, the flow of the procedure goes on to a step S1203 to make a request for an access to management information in the switch-internal management-information memory module 62.

The flow of the procedure then goes on to a step S1204 to determine whether the management-information copy information 347 has been cleared. If the management-information copy information 347 has been cleared, the processing to handle the request for an access is ended. This is because cleared management-information copy information 347 indicates that no management-information copy process is being carried out so that only normal processing needs to be carried out. On the other hand, uncleared management-information copy information 347 indicates that a management-information copy process is being carried out with the access target serving as a copy source. In this case, the flow of the procedure goes on to a step S1205 at which the copied management-information address 343 is referenced. The flow of the procedure then goes on to a step S1206 to determine whether the access request is a write request and whether the address of the access target lies ahead of the address 343 of copied management information. An address of the access target lying ahead of the address 343 of copied management information indicates that the access is an access to a region for which a copy operation has already been completed. This is because a copy operation starts from a start address toward subsequent addresses.

If at least the access request is not a write request or the address of the access target does not lie ahead of the address 343 of copied management information, the processing to handle the request for an access is ended. Such an access request is a read request or a request to write data into an area for which a copy operation has not been completed. For such a write request, the data is merely written into the copy source.

Then, the flow of the procedure goes on to a step S1207 to determine whether the management-information memory controller status 342 is "Accesses to management information in the storage controller." If the management-information memory controller status 342 is found to be "Accesses to management information in the storage controller," the flow of the procedure goes on to a step S1208 at which data is also overwritten into management information of the switch-internal management-information memory module 62 through the management-information-memory switch 6. If the management-information memory controller status 342 is found to be "Accesses to management information in the management-information-memory switch," on the other hand, the flow of the procedure goes on to a step S1209 at which data is also overwritten into management information of the controller-internal management-information memory module 321.

That is, if the access request is a write request and the address of the access target lies ahead of the address 343 of copied management information, the data is written into an area for which the copy operation has been completed. In this case, the data is also written over management information of the copy source to maintain integrity of management information after completion of the management-information copy process.

Invention's Effects Revealed by the Embodiments

As is obvious from the description of the embodiments, the present invention allows the configuration of a storage system to be changed with ease. Even in the case of a storage system comprising a plurality of system components integrated into an integrated storage system, the integrated storage system can be managed logically as a single storage system wherein the storage locations of management information can be selected in accordance with the configuration of the storage system so that it is possible to execute centralized management of management information without regard to the configuration, allowing a storage system free of deterioration of performance of making accesses to management information to be provided.

In addition, in accordance with the present invention, there is also provided a method for configuring a storage system which allows a host to make accesses to a disc storage of the storage system without suspending the operation of the storage system even while the configuration of the storage system is being changed.

What is claimed is:

1. A storage system (allowing a host computer to make accesses to disc storages and) comprising one or more storage controllers and storages, and allowing a host computer to make accesses to said storages without suspending the operation of the storage system even while the configuration of the storage system is being changed by adding or removing a storage controller from the said storage system, wherein:

each of said storage controllers includes:
- a channel interface connected to said host computer;
- an interface connected to said storages; and
- a management-information memory for storing management information of said storage system;

wherein if said storage system includes a plurality of said storage controllers, then said management-information memories employed in said storage controllers are connected to each other by a management-information-memory switch having a switch-internal management-information memory module;

if said storage system includes only one said storage controller, then said management-information memory of said storage controller has a controller-internal management-information memory controller and a controller-internal management-information memory module;

if said storage system includes a plurality of said storage controllers, then said management-information memories employed in said storage controllers each have said controller-internal management-information memory controller;

if said storage system includes only one said storage controller, then said controller-internal management-information memory controller makes an access to said controller-internal management-information memory module inside said storage controller; and if said storage system includes a plurality of said storage controllers, then said controller-internal management-information memory controllers make accesses to said switch-internal management-information memory module inside said management-information-memory switch.

2. A storage system according to claim 1, wherein, if said storage system includes only one of said storage controllers, then management information is stored in said controller-internal management-information memory module inside said storage controller and, if said storage system includes a plurality of said storage controllers, then management information is stored in said switch-internal management-information memory module inside said management-information-memory switch.

3. A method of configuring a storage system comprising one or more storage controllers and storages and allowing a host computer to make accesses to said storages without suspending the operation of the storage system even while the configuration of the storage system is being changed by adding or removing a storage controller from the said storage system, wherein:

each of said storage controllers includes:
- a channel interface connected to said host computer;
- an interface connected to said storages; and
- a management-information memory for storing management information of said storage system;

if said storage system includes only one said storage controller, then said management-information memory of said storage controller has a controller-internal management-information memory controller and a controller-internal management-information memory module; and if said storage system includes a plurality of said storage controllers, then said management-information memories employed in said storage controllers are connected to each other by a management-information-memory switch having a switch-internal management-information memory module and said management-information memories employed in said storage controllers each have said controller-internal management-information memory controller.

4. A method of configuring a storage system in accordance with claim 3, wherein, if said storage system includes only one of said storage controllers, then management information is stored in said controller-internal management-information memory module inside said storage controller and, if said storage system includes a plurality of said storage controllers, then management information is stored in said switch-internal management-information memory module inside said management-information-memory switch.

5. A method of configuring a storage system in accordance with claim 3, wherein said management-information memories employed in each of said additional storage controllers and said management-information-memory switches consist of duplicated-management-information-storing systems whereby, when some of said storage controllers are newly installed in addition to only one of said storage controllers already existing in said storage system:

said management-information-memory switches are newly added for connecting said management-information memories employed in said storage controllers to each other;

for each of said duplicated-management-information-storing systems, said management-information memory is connected to said management-information-memory switch;

to change stored locations of management information from said management-information memories of said storage controller already existing in said storage system to said management-information-memory switches, said duplicated-management-information-storing systems are sequentially subjected one system after another to a procedure comprising the steps of:

blocking one of said duplicated-management-information-storing systems;

copying management information of the unblocked one of duplicated-management-information-storing systems from said management-information memory to said management-information-memory switch of said blocked duplicated-management-information-storing system; and de-blocking said blocked duplicated-management-information-storing system; and said storage system carries out processing of an access made by said host computer to said storages while said stored locations are being changed by using management information stored in an unblocked one of said duplicated-management-information-storing systems.

6. A method of configuring a storage system in accordance with claim 3, wherein said management-information memories employed in each of said additional storage controllers and said management-information-memory switches consist of duplicated-management-information-storing systems whereby, when some of said storage controllers are removed from said storage systems to leave only one of said storage controllers in said storage system with said management-information memories connected to said management-information-memory switch in all said duplicated-management-information storing systems, to change stored locations of management information from said management-information-memory switches to said management-information memories of said storage controller to leave alone in said storage system, said duplicated-management-information-storing systems are sequentially subjected one system after another to a procedure comprising the steps of:

blocking any one of said duplicated-management-information-storing systems;

copying management information of the unblocked one of said duplicated-management-information-storing systems from said management-information-memory switch to said management-information memory of said blocked duplicated-management-information-storing system; and de-blocking said blocked duplicated-management-information-storing system, and said storage system carries out processing of an access made by said host computer to said storages while said stored locations are being changed by using management information stored in an unblocked one of said duplicated-management-information-storing systems.

7. A method of configuring a storage system in accordance with claim 3, whereby, when some of said storage controllers are newly installed in addition to only one of said storage controllers already existing in said storage system:

said management-information-memory switch is newly added for connecting said management-information memories employed in said storage controllers to each other; and to change stored locations of management information from said management-information memory employed in said storage controller already existing in said storage system to said management-information-memory switch, management information stored in said management-information memory is copied to said management-information-memory switch in a copy operation; and said storage system carries out processing of an access made by said host computer to said storages while said stored locations are being changed by using management information stored in said management-information memory employed in said storage controllers each serving as a source of said copy operation.

8. A method of configuring a storage system in accordance with claim 3, whereby, when some of said storage controllers are removed from said storage systems to leave only one of said storage controllers in said storage system with said management-information memories connected to said management-information-memory switch:

to change stored locations of management information from said management-information-memory switch to said management-information-memory of said storage controller to leave alone in said storage system, management information stored in said management-information-memory switch is copied to said management-information-memory in a copy operation; and said storage system carries out processing of an access made by said host computer to said storages while said stored locations are being changed by using management information stored in said management-information-memory switch serving as a source of said copy operation.

* * * * *